(12) United States Patent
Perea et al.

(10) Patent No.: US 11,366,738 B2
(45) Date of Patent: Jun. 21, 2022

(54) SYSTEM TO DETERMINE PERFORMANCE BASED ON ENTROPY VALUES

(71) Applicant: HEADSPIN, INC., Palo Alto, CA (US)

(72) Inventors: Brian Christian Perea, Millbrae, CA (US); Severin Smith, Toronto (CA); Brien Colwell, Redwood City, CA (US); Manish Lachwani, Los Altos, CA (US)

(73) Assignee: HEADSPIN, INC., Palo Alto, CA (US)

( * ) Notice: Subject to any disclaimer, the term of this patent is extended or adjusted under 35 U.S.C. 154(b) by 0 days.

(21) Appl. No.: 16/297,380

(22) Filed: Mar. 8, 2019

(65) Prior Publication Data
US 2019/0278689 A1    Sep. 12, 2019

Related U.S. Application Data

(60) Provisional application No. 62/641,920, filed on Mar. 12, 2018.

(51) Int. Cl.
| | |
|---|---|
| *G06F 9/44* | (2018.01) |
| *G06F 11/34* | (2006.01) |
| *G06F 17/18* | (2006.01) |
| *G06K 9/62* | (2022.01) |

(52) U.S. Cl.
CPC .......... *G06F 11/3466* (2013.01); *G06F 17/18* (2013.01); *G06K 9/6215* (2013.01)

(58) Field of Classification Search
CPC .... G06F 11/3466; G06F 17/18; G06K 9/6215
USPC .......................... 717/104–105, 124–125, 130
See application file for complete search history.

(56) References Cited

U.S. PATENT DOCUMENTS

8,094,211 B2 * 1/2012 Kwon .................. H04N 5/2351
                                                        348/229.1
9,507,566 B2 * 11/2016 Payne ........................ G06F 7/58
(Continued)

FOREIGN PATENT DOCUMENTS

CN       103856774 B     3/2016
CN       107229548 A    10/2017

OTHER PUBLICATIONS

Tsai et al., "Information Entropy Measure for Evaluation of Image Quality", 2007, Journal of Digital Imaging, pp. 1-10 (Year: 2007).*
(Continued)

*Primary Examiner* — Ted T. Vo
(74) *Attorney, Agent, or Firm* — Lindauer Law, PLLC

(57) ABSTRACT

A test device may include a performance module to determine entropy values for images, such as of a graphical user interface, to be presented on a display device of the test device. An entropy value for an image may be indicative of a distribution of data values, such as intensity or color values for pixels in the image. Patterns of entropy values over time may provide information indicative of performance of the test device. For example, a constant entropy value over time may indicate the graphical user interface is not changing. In another example, particular patterns of entry values over time may be indicative of presentation of wait indicators or other user interface elements. The entropy values may be used to determine data indicative of performance of the test device. This data may be stored locally, sent to an external device, and so forth.

20 Claims, 11 Drawing Sheets

(56) References Cited

U.S. PATENT DOCUMENTS

| | | | |
|---|---|---|---|
| 9,525,891 B2* | 12/2016 | Kim | H04N 19/46 |
| 10,432,945 B2* | 10/2019 | Alshin | H04N 19/21 |
| 2005/0286802 A1 | 12/2005 | Clark et al. | |
| 2011/0081088 A1 | 4/2011 | Xiao | |
| 2013/0003857 A1 | 1/2013 | Yu et al. | |
| 2014/0340697 A1 | 11/2014 | Kisilev et al. | |
| 2017/0085872 A1 | 3/2017 | Perron et al. | |
| 2017/0347091 A1 | 11/2017 | Madhani et al. | |

OTHER PUBLICATIONS

Nandy et al., "A Study on Gait Entropy Image Analysis for Clothing Invariant Human Identification", 2016, Springer Science, pp. 9133-9167. (Year: 2016).*

Nikhil R. Pal et al., "Entropy: A New Definition and its Applications", 1991, IEEE, pp. 1260-1270. (Year: 1991).*

Tomasz Downarowicz, "Entropy", 2017, Scholarpedia, https://web.archive.org/web/20170403064547/http://www.scholarpedia.org/article/Entropy , 10 pages. (Year: 2017).*

Young, Lee W., "Patent Cooperation Treaty International Search Report and Written Opinion dated Jun. 6, 2019", Patent Cooperation Treaty Application No. PCT/US19/21673, Patent Cooperation Treaty, dated Jun. 6, 2019.

Nickitas-Etienne, Athina, "Patent Cooperation Treaty International Preliminary Report on Patentability dated Sep. 24, 2020", Patent Cooperation Treaty Application No. PCT/US2019/021673, Patent Cooperation Treaty, dated Sep. 24, 2020.

Salsa, Francesco, "Extended European Search Report dated Oct. 28, 2021", EP Patent Application No. 19766999.7, The European Patent Office, dated Oct. 28, 2021.

* cited by examiner

SYSTEM TO DETERMINE PERFORMANCE BASED ON ENTROPY VALUES

CROSS-REFERENCE TO RELATED APPLICATION

The present disclosure is a non-provisional of, and claims priority to, U.S. Provisional Patent Application No. 62/641,920 filed on Mar. 12, 2018 and entitled "Multiple Device Test Device", which is incorporated herein by reference in its entirety.

INCORPORATION BY REFERENCE

U.S. patent application Ser. No. 14/850,798 filed Sep. 10, 2015 and titled "System for Application Test", now U.S. Pat. No. 9,681,318, is hereby incorporated by reference in its entirety.

U.S. patent application Ser. No. 14/976,480 filed Dec. 21, 2015 and titled "System for Network Characteristic Assessment", now U.S. Pat. No. 9,749,888, is hereby incorporated by reference in its entirety.

U.S. Provisional patent application Ser. No. 15/439,755 filed on Feb. 22, 2017 titled "Adaptive Application Behavior Based On Assessed Network Characteristics", now U.S. Pat. No. 10,178,569, is hereby incorporated by reference in its entirety.

BACKGROUND

Mobile devices executing applications that utilize data networks during operation may experience failures or otherwise produce adverse user experiences as a result of network conditions. Testing of these applications may be performed to prevent or mitigate the impacts of failures.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
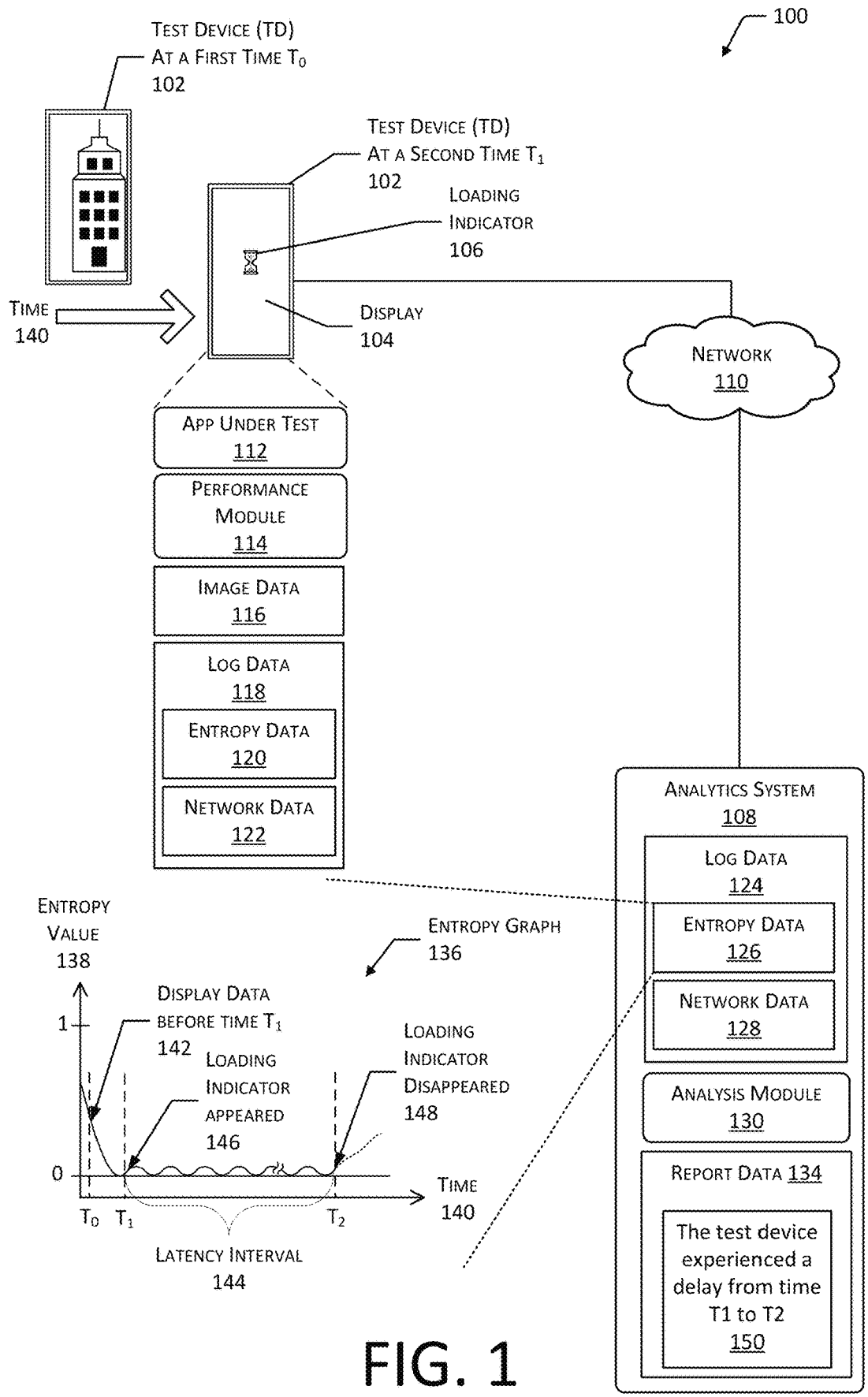
FIG. 1 depicts a diagram of a system for testing applications that utilize network resources, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Mobile devices may execute an application to provide various functions. Mobile devices may include, but are not limited to, smartphones, laptops, tablet computers, embedded devices, wearable computing devices, appliances, automobiles, aircraft, and so forth. Functions provided by the application may involve retrieval of data, presentation of that data to a user, processing of data, other operations, or any combination thereof. In some embodiments, the application may be a standalone application.

Some applications may communicate with a destination device, such as a server, using a network. For example, a mapping application may send information indicative of a position of the mobile device to a mapping server, and the mapping application may receive map data to present on a display of the mobile device in response to sending the information. Problems with this communication may result in the application failing to perform the desired function, error messages, static or blank display data, improper operation, other issues, or any combination thereof. Continuing the example above, a long latency or delay in receiving the map data may cause the application on the mobile device to present an error to the user or may cause a long latency or loading delay during which the data on the display may not update. These problems may result in an adverse user experience. For example, the user may discontinue using the application because of these problems, and instead use another application.

Embodiments of systems, methods, and devices are described below that may determine one or more performance parameters of a mobile device or of an application executing on a mobile device based on entropy determined from information to be presented by the mobile device. The performance parameters may be based on the performance of some other system, such as a delay in a webserver responding, network throughput, other factors, or any combination thereof. Such information may include, for example, one or more images to be presented on a display, audio data to be presented to an audio output (such as a speaker), other information, or any combination thereof. For example, the entropy value may comprise a statistical measure of randomness that can be used to characterize an array of data. In image processing, the term "entropy" may refer to a statistical measure of randomness that can be used to characterize the texture (spatial arrangement of colors or intensities) of an image. In a particular example, the entropy may be determined from a numeric array of values corresponding to an image, a numeric array of values corresponding to a sound, other data, or any combination thereof. Entropy analysis may be performed on image data, audio data, other data, or any combination thereof. The term "entropy" may also have other definitions that generally relate to the randomness of the content of a particular data item, such as an image.

Entropy Analysis

Information entropy may be measured in bits or "shannons" and can be a useful metric for measuring the information content of a data source commonly modeled by a Bernoulli process. A Bernoulli process is a sequence of binary random variables each of which can take only two values, typically 0 or 1, which are mutually exclusive and exhaustive. For example, a sequence of coin flips may be considered a Bernoulli process. The binary or "Shannon" entropy function for a sequence of Bernoulli trials with $Pr(X=1)=p$ and $Pr(X=0)=1-p$ is given by $H(X)=H_B(p)=-p \log_2 p - (1-p) \log_2 (1-p)$ where $0 \log_2 0$ is taken to be 0 and X is a random variable.

Images may be treated as a stochastic data source. Instead of a Bernoulli process, an image consists of an array of pixels with each pixel having a value within the image datatype range occurring with some probability $P(x_i)$, where $x_i$ represents a given pixel value (grey level, for example). Entropy can be written generally as $H(X)=-\Sigma_{i=1}^{n} P(x_i) \log_b P(x_i)$ where b is the base of the logarithm function and may represent a number of possible values for a given pixel, and n represents a total number of pixels. Images are commonly represented as 8-bit arrays with N×M×D elements. Each element in an 8-bit array may have a value in a 256-bit range [0, 255]. For grayscale images, D=1, and therefore each pixel may have 256 possible values. Thus b=256 with units of 8 bits or one byte and $P(x_i)$ may be calculated by creating a histogram with 256 bins for values in [0, 255] and dividing by the total number of pixels, n. It should be understood that the entropy is a scale-independent value and requires no additional normalization as formulated. In the above-described implementation, entropy is calculated as a sum of values for non-zero probabilities, since $P(x_i)=0$ would result in 0*log(0), which is indeterminate.

For RGB images, each pixel has a depth of three elements, a single pixel may have 256*256*256=16777216 possible values. Since it may be computationally expensive to bin pixels in such a large range, practical alternatives may include transforming the image to grayscale, or simply taking the average of the image entropy across all channels.

Image entropy may be interpreted as a distribution of pixel values ranging from a minimum theoretical entropy where all pixels are of equivalent intensity (for example, all of the pixel values are the same, producing a monochromatic image on the display) to the maximum entropy where all pixel intensities are equally likely (for example, an image that has a large amount of image content such that the pixel values vary randomly). From an information theory perspective, the point of minimum entropy where all pixels are the same is the point of lowest diversity, lowest information content, and maximum order (or least randomness).

Mathematically, the minimum value for entropy is zero, and the maximum value is one. The minimum entropy value implies that all values in a distribution are equal. For an image this means that all pixels have the same value. The maximum entropy value implies that the values in a distribution are uniformly distributed. Images with this property have a rich distribution of pixel values and high information content. This scale-independent metric allows for convenient and interpretable comparison of images with different sizes on a range of [0, 1].

The time series produced by calculating this image entropy value for each image in a video is particularly useful. Rather than using computing resources to scan through the images of the video, a time-series or graph of the entropy values enables a quick visual summary of the evolving information content in the video feed. Within the entropy graph, blank images of any color or images with a relatively uniform display content have low entropy values whereas images with considerable contrast and color variation have relatively high entropy values.

In some embodiments, the image entropy value derived from the content of an image may provide useful information when viewed in a time series. In particular, randomness or entropy as represented by the entropy value or other hash value may provide information that can be used to evaluate the performance of an application or of the computing device.

Reading the Entropy Time Series

For example, in a video from a mobile phone under test, there may be distinct phases where content is requested by a user by opening a new page, the application loads the new content, perhaps showing a spinner or loading indicator to provide visual feedback, and then the content finally loads. Because the application does not typically have ready the information the user requested, there may be a delay in which the screen is blank or nearly so. In some instances, during the delay, the image that was on the screen when the content was requested may remain frozen on the screen, and a spinner or loading indicator may be superimposed over the frozen or static image until the requested content finally loads.

These transitions in what is presented on the page can be detected in the video entropy time series. The transition from a first page to a requested page may be captured as a step decrease or as a plateau over a brief period before the entropy begins changing. While the content is loading, the entropy may remain low or may remain substantially static. In some instances, the entropy may fluctuate periodically in response to periodically rotating or evolving loading indicators, such as spinners, hour glasses, bar graphs, and the like. As content begins to load, the entropy may increase incrementally and in proportion to the amount of information on the screen.

In some instances, content placeholders, such as the loading indicator, can contribute less to the entropy value than the fully loaded content. By determining and assessing the entropy values, useful data about operation of the mobile phone test may be gathered quickly and efficiently.

While the example describes a mobile phone test, these techniques could be used for any mobile devices or fixed devices. For example, the entropy may be used to assess operation of a tablet computer, desktop computer, embedded device, and so forth. These techniques may be used to assess an application under test, regular operation of a device, an operating system, and so forth.

In some embodiments, an application executing on a mobile computing device, such as a smartphone, may experience intermittent performance issues, which may be noticeable to a user of the device because the device fails to load information for a period of time, which, for example, may be greater than a time threshold. Sometimes, the mobile computing device may display a blank screen with a loading indicator (such as a spinner, an hourglass, or another visual indicator) during a time interval when the application does not have information to display or otherwise present. A software developer may want to collect information about the performance of an application executing on various computing devices, at different times and at different geophysical locations.

Embodiments of systems, methods, and devices are described below that can include an application that may be executing on a mobile computing device and that may determine entropy values based on information to be presented by the mobile computing device. Such information may include images, sounds, or other information. The mobile computing device may be configured to determine data indicative of performance or operation of the application or the mobile computing device (as seen by a user) based on the entropy values. For example, the entropy values may reveal latency intervals, which may correspond to periods of time when the entropy values indicate low information content or static information content (when the information content should be changing). In another example, the data indicative of performance may be based on the performance of some other system, such as a delay in a webserver responding, network throughput, other factors, or any combination thereof. In some instances, correlation of the entropy values with network throughput values may reveal a function within the application that may require editing, such as when the network throughput values are high, but the entropy values reveal a latency interval. In other instances, correlation of the entropy values with reception of input data, for example, from an input interface, may reveal user interactions and the effect of user interactions on the application. The entropy data may also be used to examine the overall performance of the application based on the presence or absence of latency intervals, and so on.

In some embodiments, the entropy values may be used to determine data indicative of the operation of the computing device and of the application based on data to be presented to the user. In other words, the entropy values may reveal the user experience, which can be difficult to evaluate objectively. By examining the entropy values, intervals of no or low information content can be identified, correlated with network throughput data, correlated to received inputs, and analyzed. The analysis may reveal program errors, coding or function issues, and other information, which may be used to improve the functioning of the mobile computing device.

In some implementations, the entropy values may be correlated to test data, which may allow for correlation of entropy to device metrics including the central processing unit, memory devices, communication interfaces, and so on. The test data may be used to drive the operation, and the entropy may provide insights into performance of the device, as seen by the user. Other implementations are also possible.

In some embodiments, the entropy values provide a non-invasive measure of the applications' performance, which can be used to improve the functioning of the application and of the mobile computing device. One possible example of a system including a test device to determine performance based on entropy values is described below with respect to FIG. 1.

Illustrative System

FIG. 1 depicts a diagram of a system 100 for testing applications that utilize network resources, according to one implementation. The system 100 may include a test device (TD) 102, which may be a mobile device. The TD 102 may include, but is not limited to, smartphones, laptops, tablet computers, embedded devices, wearable computing devices, appliances, automobiles, aircraft, and so forth. The TD 102 may include a display 104 that may present visual content that can change over time. The display 104 of the TD 102 may present a loading indicator 106 at various times. The TD 102 may communicate with one or more computing devices, such as an analytics system 108 through a network 110.

The network 110 may include a cellular network, a satellite network, the Internet, local area networks, other networks, or any combination thereof. The connections used by the TD 102 and the analytics system 108 to communicate with the network 110 may include, but are not limited to, a wired Ethernet connection, a wireless local area network (WLAN) connection such as Wi-Fi, a mobile telephone connection through a base station, another type of connection, or any combination thereof.

The TD 102 may be a mobile computing device that includes an application under test (AUT) 112. The AUT 112 may be an application that is at any stage in a development or maintenance lifecycle. For example, the AUT 112 may comprise an alpha (or prerelease) version of software, or may comprise a previously released production version that is undergoing further testing.

The TD 102 may further include a performance module 114, which may be an application, a plugin, a software development kit (SDK), a widget, or another type of software component. The TD 102 may further include a memory to store image data 116 and log data 118, which may include entropy data 120 and network data 122. The memory may include, but is not limited to, a cache memory, a display buffer, a non-volatile memory, other memory components, or any combination thereof. The image data 116 may include video frames stored, for example, in a display buffer. The entropy data 120 may include data determined by the performance module 114 or the AUT 112. The network data 122 may be determined by circuitry, such as a network transceiver, of the TD 102.

The performance module 114 may monitor one or more parameters, such as image information to be presented by the TD 102. The performance module 114 may select a first image and a second image of a sequence of images from the image data 116. The performance module 114 may determine a first entropy value indicative of a distribution of data values within the first image, and a second entropy value indicative of a distribution of data values within the second image. The performance module 114 may then generate data indicative of performance of the TD 102 based on the first entropy value and the second entropy value. In an example, the data indicative of performance may be based on the performance of some other system, such as a delay in a webserver responding, network throughput, other factors, or any combination thereof. The performance module 114 may access log data 118 to store the data as entropy data 120. In some embodiments, the TD 102 may send the entropy data 120, the network data 122, the data indicative of the operation, or any combination thereof to the analytics system 108 through the network 110.

In some implementations, the performance module 114 may determine a subset of data values of a first data item (e.g., an image) of a sequence of images. The performance module 114 may further determine a first entropy value for the first data item based on the subset of data values. For example, the performance module 114 may determine a subset of data values from an image and may determine probabilities for the subset. The probabilities may represent the likelihoods that the subset of data values have a particular value. The first entropy value may be determined by summing the probabilities. Other implementations are also possible.

The analytics system 108 may include a memory to store log data 124, including entropy data 126 and network data 128 received from one or more TDs 102. The analytics system 108 may also include an analysis module 130. The analysis module 130 may generate report data 134 based on the entropy data 126, the network data 128, other data, or any combination thereof.

In some implementations, images may be comprised of a plurality of data values. The analysis module 130 may determine a first probability value for a first data value of a first image, and may determine a second probability value for a second data value of the first image. For example, the first probability value may represent a likelihood that the first data value has a particular color, intensity, or other characteristic. The second probability value may represent a likelihood that the second data value has a particular color, intensity, or other characteristic. In some implementations, the first probability value is independent of the second probability value. The first and second probability values may be added together to determine an entropy value for the first image. The process may be repeated for one or more images of a sequence of images. Other implementations are also possible.

The entropy data 126 may include time-series data corresponding to the distribution of values within a sequence of images (e.g., video frames) over time. In this example, the entropy data 126 associated with a particular device, such as the TD 102, may be visualized using an entropy graph 136 of entropy values 138 versus time 140. It should be appreciated that the data provided to the display 104 of the TD 102 may vary over time 140, such that the information presented on the display 104 at a first time $T_0$ may differ from that presented on the display 104 at a second time $T_1$. The entropy graph 136 reflects such variation.

The entropy graph 136 depicts a decreasing entropy over time. At time $T_0$, the display 104 of the TD 102 depicts a building, which is represented by an entropy value that is between zero and 1 on the entropy graph 136. At time $T_1$, the display 104 has transitioned to a monochrome background with the loading indicator 106 superimposed over the monochrome (low entropy) background. The loading indicator 106 may be indicative of operation of the AUT 112, indicative of network throughput, indicative of some other parameter, or any combination thereof. During a latency interval 144 that extends from time $T_1$ to time $T_2$, the loading indicator 106 may be presented on the display 104 at 146. The entropy of the background on the display 104 remains static or substantially constant during the latency interval 144. However, the loading indicator 106 may spin or otherwise change, causing the entropy value 138 to fluctuate during the latency interval 144. In this example, the loading indicator 106 may be spinner or an hourglass, which may spin periodically, causing the entropy value 138 to fluctuate. While the illustrated example of the entropy graph 136 within the latency interval 144 shows the fluctuations to be sinusoidal, it is possible that the fluctuations may be aperiodic or that the fluctuations may be represented by irregular changes (in amplitude, in frequency, or both) during the latency interval 144. At time $T_2$, the loading indicator 106 may disappear (as generally indicated at 148), and the entropy value 138 may begin to change from the average entropy value within the entropy interval 144.

In one possible example, the latency interval 144 may be caused by a network connectivity issue that caused the network throughput to decrease. For example, the TD 102 may be operated in an elevator that interferes with signal reception. In another example, the TD 102 may be operated in a vehicle that passes through a tunnel. In another possible example, the latency interval 144 may be caused by the AUT 112. In an example, the AUT 112 may encounter an error. Alternatively, the AUT 112 may have a defect or other issue that may impact performance and that may manifest as a delay in presentation of data to the display 104. In an example, the performance parameters may be based on the performance of some other system, such as a delay in a webserver responding, network throughput, other factors, or any combination thereof. In some instances, the delay in presentation of data may be indicative of poor performance, which may cause an adverse user experience. Such delays may be detectable based on a time-series of entropy data 120 from the TD 102.

The analytics system 108 may utilize the analysis module 130 to determine data indicative of performance of one or more of the TDs 102 based on the entropy data 126 and the network data 128. Further, the analysis module 130 may generate report data 134 based on the data indicative of performance. In an example, the report data 134 may include a report 150 that includes data indicative of the entropy data 120 of the TD 102. In some instances, the report data 134 may also include data indicative of operation of multiple TDs 102.

While the embodiment depicted in FIG. 1 shows only the TD 102, it should be understood that the analytics system 108 may receive entropy data 120 and network data 122 from multiple TDs 102 and may store the received data as entropy data 126 and network data 128 in the log data 124. Further, it should be appreciated that the TDs 102 may be distributed in a plurality of different geophysical locations and that the entropy data 120 and the network data 122 for each TD 102 may be independent of such data collected by other TDs 102 and sent to the analytics system 108 through the network 110.

Figure 2:
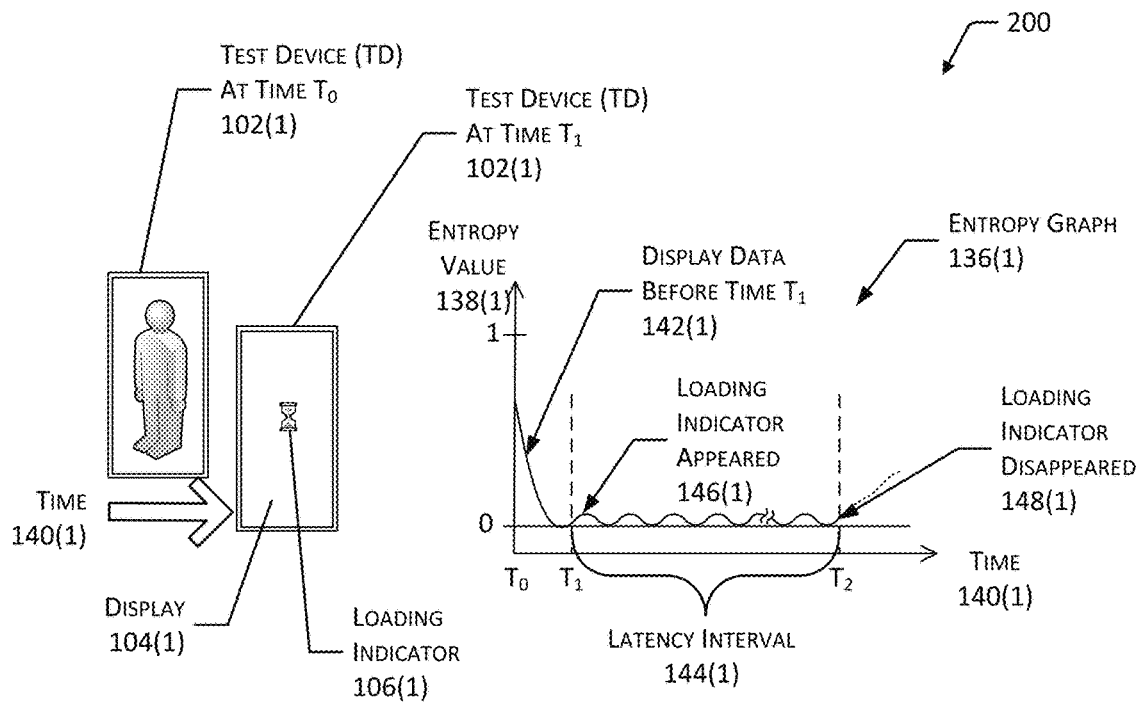
FIG. 2 depicts a diagram of test devices and including graphs of entropy over time for each test device, according to one implementation.
Figure 2:
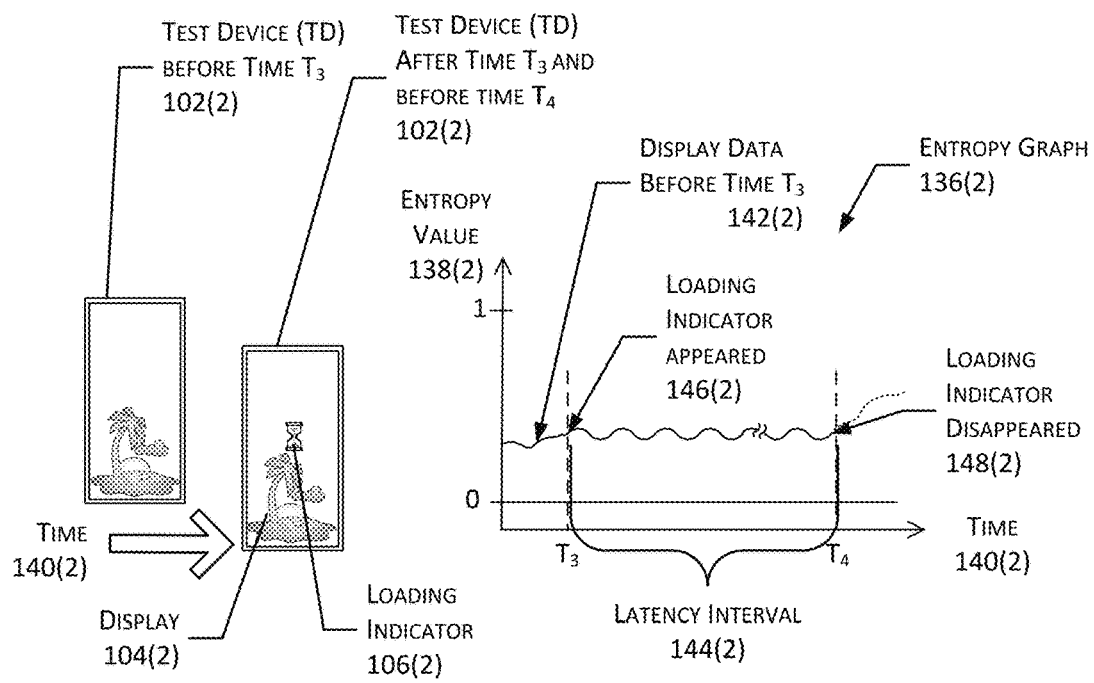

FIG. 2 depicts a diagram 200 of TDs 102(1) and 102(2) and including entropy graphs 136(1) and 136(2) of entropy values 138 versus time 140 for each TD 102, according to one implementation. The TD 102(1) at a first time $T_0$ may provide image data (e.g., a picture of a human being) to the display 104(1). At time $T_1$, the display 104(1) of the TD 102(1) may present a blank (or monochromatic) background with a loading indicator 106(1). Referring to the entropy graph 136(1), between the time $T_0$ and the time $T_1$, the entropy value 138(1) before time $T_1$ (generally indicated at 142(1)) decreases over time 140(1) rapidly from a relatively high entropy value 138 at a first time $T_0$ to a relatively low entropy value 138 at a second time $T_1$, where the relatively low entropy value 138 at the second time $T_1$ may be indicative of low information. At time $T_1$, the display 104(1) may present the loading indicator 106(1), as generally indicated at 146(1). During a latency interval 144(1) that extends from time $T_1$ to time $T_2$, the entropy value 138(1) remains at a low level, fluctuating based on movement or changes associated with the loading indicator 106(1). At time $T_2$, the loading indicator disappears 148(1) and the information content begins changing as reflected by the changing entropy values 138.

With respect to TD 102(2), the display 104(2) depicts an image of an island at a first time that is before time $T_3$, generally indicated at 142(2). At time $T_3$, the TD 102(2) may provide a loading indicator 106(2) to the display 104(2) (as generally indicated at 146(2)). In this instance, the image of the island remains on the display 104(2), and the loading indicator 106(2) is superimposed over the image. Referring to the entropy graph 136(2), the entropy value 138(2) increases slightly in response to the introduction of the loading indicator 106(2) and does not change (apart from fluctuations due to the rotation or other movement of the loading indicator 106(2)) within the latency interval 144(2). At time $T_4$, the loading indicator 106(2) disappears, as generally indicated at 148(2).

It should be appreciated that the TD 102(1) may be located at a first geophysical location, and the TD 102(2) may be located at a second geophysical location. Further, the TD 102(1) may be executing a different AUT 112 as compared to the TD 102(2). In the illustrated example, both TDs 102(1) and 102(2) experience a latency interval 144. The amplitude of the entropy value 138(2) in entropy graph 136(2) is greater than the entropy value 138(1) in entropy graph 136(1) during the respective latency intervals 144. However, the entropy values 138 may represent a pattern or signature indicative of a particular loading indicator 106. A pattern or signature may be determined from repeating entropy values 138 in a time series or based on historical analysis. A repeating pattern or signature may be represented by repeating entropy values 138, repeating differences in entropy values 138, or other recurring shapes, slopes, variations, or other discernible contents of the time series of entropy values 138. In other examples, the varying entropy values 138 within the latency interval 144 may have a different waveform. In some embodiments, it may be possible to determine a loading indicator 106 based on the entropy values 138 within a subset of entropy values 138.

In some implementations, a pattern may be determined from a sequence of entropy values 138 that decrease in amplitude from a first time to a second time and from a second sequence of entropy values 138 that increase in amplitude from a third time to a fourth time. Other implementations are also possible.

Further, in some embodiments, a pattern of entropy values 138 may repeat. Such a pattern may be indicative of a particular operation performed by the TD 102. For example, during an operation involving the downloading and playing of music videos from a website, the entropy values 138 may repeat a pattern as the application transitions from a first video to a second video (and optionally as the application displays an advertisement). At the beginning of each transition, the entropy value 138 may decrease as the background changes to a monochromatic background or to a near monochromatic background and then the entropy value 138 may increase rapidly as the selected video is loaded and begins playing. This repeating pattern may be indicative of normal operation of a particular application.

In another example, a user interaction may trigger or initiate an entropy pattern. For example, a "swipe right" interaction may cause the entropy value 138 to decrease rapidly as the image presented appears to slide off of the display 104 leaving the display 104 blank, for example. After this rapid decrease, the entropy value 138 may increase rapidly as a new image is loaded. This pattern may be repeated in response to interactions with the TD 102. Other examples are also possible.

In certain embodiments, data indicative of operation of the TD 102(1) and of the TD 102(2) may be determined based on the entropy values 138. Further, repeating patterns of entropy values 138 within a time-series may be indicative of operation of a particular application performing routine operations, such as "auto play" or other operations, or may be indicative of a defect or error in the application, which may result in an adverse user experience. While the repeating patterns of data depicted in FIG. 2 occur within the latency interval 144, it is possible for subsets of the entropy values 138 to repeat at various locations within the time series. Other embodiments are also possible.

In some embodiments, it may be desirable to control operation of a TD 102 remotely. In an example, a TD 102 or another test device may be tethered to a computing device or may include computing code that enables remote access or remote control of the device. One possible example of a system that can enable multiple different testing scenarios for determining operation of a device based on the entropy data 120 is described below with respect to FIG. 3.

Illustrative Testing System

Figure 3:
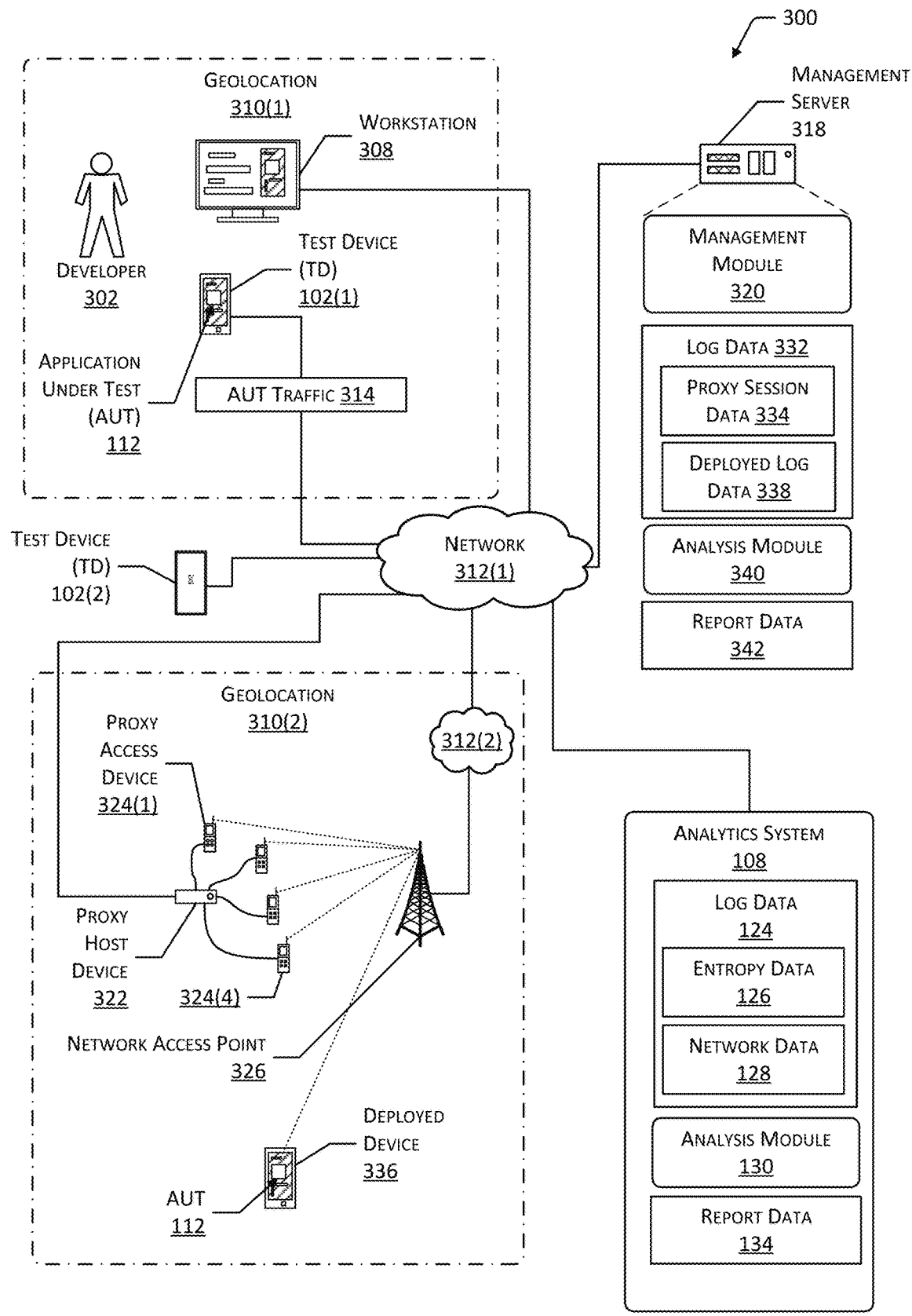
FIG. 3 depicts a block diagram of a system for testing applications including a variety of computing devices to provide entropy data, according to one implementation.

FIG. 3 depicts a block diagram of a system 300 for testing applications including a variety of computing devices to provide entropy data 120, according to one implementation. A developer 302 may be an individual, group of individuals, or entity that is tasked with creating a new application, maintaining an existing application, re-factoring an existing application, performing tests on an application, testing media content systems, performing other operations, or any combination thereof. The developer 302 may be working on an application under test (AUT) 112. The AUT 112 may be executed on a computing device such as a test device (TD) 102(1), a workstation 308, other devices, or any combination thereof. The workstation 308 may comprise a laptop, desktop computer, a tablet computer, another computing device, or any combination thereof.

The workstation 308 may include an integrated development environment (IDE) to facilitate the creation and editing of program code, debugging, compiling, performing other operations, or any combination thereof. In some implementations, the workstation 308 may comprise an emulator or simulator that is designed to execute the AUT 112 as if it were executing on another piece of hardware, under a different operating system, and so forth.

The developer 302 may test the AUT 112 to determine problems associated with use of the AUT 112, for example, based on entropy values 138 determined from the AUT 112 executing on the TD 102(1). Once those problems have been determined, they may be mitigated. For example, the developer 302 may change the program code of the AUT 112 to remedy the problem. The developer 302 may use the techniques described below to determine at least some of the problems associated with operation of the AUT 112.

One or more of the developer 302, the TD 102(1), or the workstation 308 may be located at a first geolocation 310(1). The geolocation 310 comprises a geographic location, such as a particular room, building, city, state, country, and so forth. For example, the geolocation 310 may be specified by a set of coordinates with regard to latitude and longitude on the surface of the Earth.

One or more of the TD 102(1) or the workstation 308 may be communicatively coupled to a first network 312(1). The first network 312(1) may, in turn, be connected to or be part of a larger network. For example, the first network 312(1)

may comprise the Internet. The first network 312(1) may be an embodiment of the network 110 in FIG. 1.

The connection used by the TD 102(1) or the workstation 308 may include, but is not limited to, a wired Ethernet connection, a wireless local area network (WLAN) connection such as Wi-Fi, and so forth. For example, the first geolocation 310(1) may comprise an office where the developer 302 is working. The TD 102(1) may connect to a local Wi-Fi access point that is connected via an Ethernet cable to a router. The router, in turn, is connected to a cable modem that provides connectivity to the network 312(1).

During operation, the AUT 112 may rely on access to an external resource, such as a destination device, another computing device, a data source, or any combination thereof. For example, the AUT 112 may comprise a social networking application that sends data generated by a user and retrieves for presentation information from a server. As a result, in some implementations, the AUT 112 may require access to the destination device for normal operation. In the illustrated example, the destination device or data source is omitted for clarity. However, it should be understood that the AUT 112 may communicate with many different computing devices and data sources (destination devices) through the network 312(1).

The AUT 112 may generate AUT traffic 314 that may be exchanged with a destination device during operation. Traditionally, the AUT traffic 314 generated by the TD 102(1) at the first geolocation 310(1) would be sent to the first network 312(1) and on to the destination device. However, in some implementations, a developer 302 may want to exert greater control of the TD 102(1) in order to generate further test data related to the first geolocation 310(1).

To provide the functionality described herein, the developer 302 may incorporate a software development kit (SDK) into the AUT 112. For example, at compile time, the SDK may be included into the compiled AUT 112. In other implementations, plugins, macros, other instruction sets or techniques other than an SDK may be used to provide the functionality described herein. For example, lines of computer code that provide the functionality of at least a portion of the SDK may be incorporated into the code base of the AUT 112.

In one possible embodiment, the SDK may provide a user interface to the developer 302 that allows for the redirection of the AUT traffic 314. The SDK may comprise instructions to establish communication with a management server 318. For example, the SDK may add a user interface that allows the developer 302 to interact with the management module 320.

The management server 318 may utilize the management module 320 to coordinate the activities of one or more of proxy host devices 322 or proxy access devices 324. The proxy host device 322 connects to the first network 312(1) and also to one or more of the proxy access devices 324. For example, the proxy host device 322 may comprise a desktop computer to which multiple proxy access devices 324 can be tethered. In the illustrated example, four proxy access devices 324 are coupled to the network 312(1) through the proxy host device 322. In some implementations, the proxy host device 322 may comprise a tablet computer, server, etc. Any number of proxy access devices 324 may be tethered to the proxy host device 322.

The proxy access devices 324 may also connect to a network access point 326. The network access point 326 provides connectivity to a second network 312(2). For example, the proxy access devices 324 may comprise commodity cellphones, the network access points 326 may comprise cell phone towers, and the second network 312(2) may comprise a wireless wide area network (WWAN), such as a wireless cellular data network (WCDN). The second network 312(2) may in turn be connected to the first network 312(1). For example, the WCDN operated by a telecommunication company may interconnect or have a peering agreement with an Internet backbone provider. As a result, a user of the second network 312(2) may be able to access resources on the first network 312(1), and vice versa.

The proxy access devices 324 may be located at a geolocation 310(2) that is different from that of the TD 102(1). For example, the proxy host device 322 and attached proxy access devices 324 may be installed at a second geolocation 310(2), such as in another city, state, country, and so forth.

Further, a TD 102(2) may be connected to the network 312(1), to the network access point 326, or through another network access point. The TD 102(2) may receive data and provide data indicative of the operation of the TD 102(2) to the analytics system 108 through the network 312(1). The data may include entropy data 120, network data 122, other data, or any combination thereof.

Returning to the AUT 112, as part of the testing process, the developer 302 may use the user interface to access the management module 320 of the management server 318. From the user interface, the developer 302 may select one or more of a particular geolocation 310 or particular proxy access device 324 to use during testing. The management module 320 may maintain information about the proxy access devices 324, such as geolocation 310, availability, cost, type of proxy access device 324, and so forth. The management module 320 may also determine information from the TD 102(2), such as via an opt-in option or based on information received during download.

The management module 320 may coordinate establishment of the first connection between the AUT 112 and the proxy access device 324 that was selected. For example, based on the selection by the developer 302, the management module 320 may determine the proxy host device 322 and retrieve information such as digital certificates, cryptographic credentials, network address, other information, or any combination thereof. In one implementation, the management module 320 may communicate with the proxy host device 322 to prepare the proxy host device 322 for communication with the AUT 112. In another implementation, the management module 320 may provide configuration data to the AUT 112, which in turn connects to the proxy host device 322 and sends the configuration data.

During testing, the AUT traffic 314 may be routed through the first network 312(1) to the proxy host device 322, through the proxy access device 324 to the second network 312(2), and then onto the first network 312(1) to ultimately arrive at the destination device, such as a server, another computing device, another TD 102, the analytics system 108, another device, or any combination thereof. The AUT traffic 314 may include outbound application traffic and inbound application traffic. The outbound application traffic may comprise data that is sent from the AUT 112 to the destination device, and the inbound application traffic may comprise data that is sent from the destination device to the AUT 112. The AUT traffic 314 may represent network throughput data, which may be captured separately from that captured, for example, by a network transceiver of the TD 102.

During operation, the AUT 112 may direct outbound application traffic to the proxy host device 322 associated with the selected proxy access device 324. The proxy host device 322 in turn transfers the outbound application traffic to the proxy access device 324, which then sends the outbound application traffic to the second network 312(2). The second network 312(2) may then direct the outbound application traffic to the destination device. Inbound application traffic from the destination device may follow the reverse path.

The management server 318 may collect log data 332 associated with operation of the system. The log data 332 may include proxy session data 334. The proxy host device 322 may be configured to generate the proxy session data 334. The proxy session data 334 may include "breadcrumb" data, information associated with operation of the proxy access device 324, packet capture of data transferred by the proxy host device 322, other data, or any combination thereof. The breadcrumb data may include, for a particular instant or interval of time, one or more operational parameters including a current page on a website, a type of network to which the proxy access device 324 is connected, a quantity of data received, a quantity of data transmitted, a latency to the destination device, data throughput, received signal strength, transmit power, cost associated with data transfer on the second network 312(2), entropy data 120, other data, or any combination thereof. For example, the breadcrumb data may indicate that the proxy access device 324 was connected at timestamp 201508172312030092 to a webpage example.com/main.html using a 4G network connection with a received signal strength of 14 dBm, a transmit power of 7 dBm, data throughput of 400 Kbps, and so forth. The proxy session data 334 is thus the product of the AUT 112 operating on a real-world second network 312(2) at a desired geolocation 310. The resulting proxy session data 334 may be representative of the real world, including the associated complexities and nuances.

The management server 318 may obtain the proxy session data 334. For example, the proxy host device 322 may send the proxy session data 334 to the management server 318 during the test session, after the test session, periodically, or according to a predetermined schedule. In another example, the management server 318 may poll the proxy host devices 322 for the proxy session data 334.

Instead of, or in addition to, the proxy session data 334, one or more deployed devices 336 may provide deployed log data 338 to the management server 318. The deployed devices 336 may include, but are not limited to, smartphones, laptops, tablet computers, embedded devices, wearable computing devices, appliances, automobiles, aircraft, and so forth. The deployed device 336 may execute the AUT 112 that incorporates the SDK, which may be configured to collect deployed log data 338 during operation of the AUT 112 on the deployed device 336. The deployed log data 338 may comprise information indicative of, at a particular time, data including the geolocation 310 of the deployed device 336, breadcrumb data, and other information associated with the AUT traffic 314 or the operation of the deployed device 336. For example, the user may agree to allow for the collection of the deployed log data 338 on the deployed device 336. While the user is using the AUT 112, deployed log data 338 is collected. As a result, the deployed log data 338 comprises real-world information that is obtained from actual users using the AUT 112. The geolocation 310 data may be obtained from a positioning device such as a GPS receiver, from a service such as Wi-Fi hotspot geolocation lookup, from a network provider based on signal strength or time delay at several network access points 326, and so forth.

An analysis module 340 may process the proxy session data 334 and generate report data 342. For example, the analysis module 340 may parse the proxy session data 334 to determine a first timestamp of when a first request was sent and a second timestamp of when a first response to the first request was received. Based on the first timestamp and second timestamp, a latency to fulfill the request to the second network 312(2) may be determined.

In some implementations, the analysis module 340 may determine a subset of data values of a first data item (e.g., an image) of a sequence of images. The analysis module 340 may further determine a first entropy value 138 for the first data item based on the subset of data values. For example, the analysis module 340 may determine a subset of data values from an image and may determine probabilities for the subset. The probabilities may represent the likelihoods that the subset of data values have a particular value. The first entropy value 138 may be determined by summing the probabilities. Other implementations are also possible.

In some implementations, the report data 342 may specify one or more optimizations of possible modifications to the AUT 112. For example, the report data 342 may specify a particular portion of the AUT 112 that is generating requests with latencies over a threshold value.

The deployed log data 338 may be transmitted in real time or at specified intervals to the management server 318 or another device. For example, the AUT 112 on the deployed device 336 may be configured to send the deployed log data 338 in real time. Real time or near real time may comprise actions that take place within a threshold maximum amount of time. For example, the deployed log data 338 may be deemed to be real time if collected and transmitted within 100 milliseconds (ms). In a real time or near real time configuration, the management server 318 may be able to quickly generate report data 342 indicative of a problem associated with the AUT 112. As a result, the developer 302 may be able to quickly mitigate problems, thus improving the user experience.

In the illustrated example, the management server 318 may collect data related to various devices that are executing the AUT 112 at various geolocations 310 and under various conditions (e.g., via a network access point 326, via the network 312(1), through a proxy host device 322, or any combination thereof). The analytics system 108 may receive data indicative of operation of one or more TDs 102 as well as data from the management server 318.

The analytics system 108 may store received data from the TDs 102 or from the management server 318 in the log data 124. The data may include entropy data 126 and network data 128. In some embodiments, the network data 128 may include breadcrumb data as discussed above. The analytics system 108 may process the entropy data 126 and the network data 128 to determine data indicative of operation of the TD 102 and of the AUT 112. The analytics system 108 may include an analysis module 130, which may generate report data 134 including the data indicative of operation of the TD 102 and the AUT 112 based on the entropy data 126, the network data 128, other data, or any combination thereof. The report data 134 may be used by the developer 302 to mitigate problems, improve the functionality and responsiveness of the AUT 112, and improve the user experience.

Figure 4:
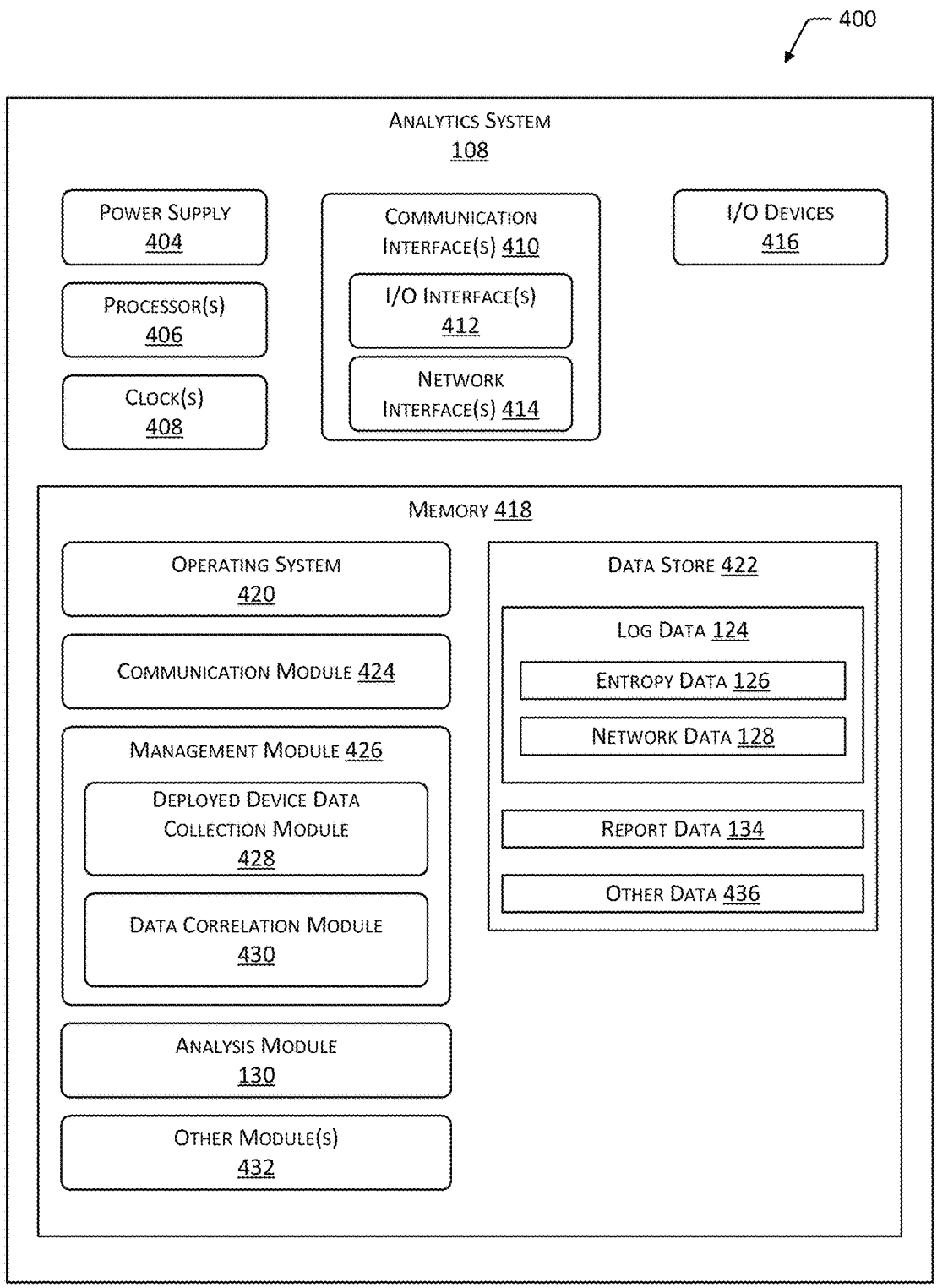
FIG. 4 depicts a block diagram of a computing device acting as an analytics system, according to one implementation.

FIG. 4 depicts a block diagram 400 of a computing device acting as an analytics system 108, according to one implementation. The analytics system 108 may include one or more computing devices. Any type of computing device and any number of networked computing devices may perform the implementations described herein.

One or more power supplies 404 may be configured to provide electrical power suitable for operating the components of the analytics system 108. In some implementations, the power supply 404 may include a rechargeable battery, fuel cell, photovoltaic cell, power conditioning circuitry, other devices, other circuits, or any combination thereof.

The analytics system 108 may include one or more hardware processor(s) 406 (processors) configured to execute one or more stored instructions. The processor(s) 406 may include one or more cores. One or more clocks 408 may provide information indicative of date, time, ticks, and so forth. For example, the processor(s) 406 may use data from the clock 408 to generate a timestamp, trigger a preprogrammed action, and so forth. The analytics system 108 may include one or more buses or other internal communications hardware or software that allows for the transfer of data between the various modules and components of the analytics system 108.

The analytics system 108 may include one or more communication interfaces 410, such as input/output (I/O) interfaces 412, network interfaces 414, and so forth. The communication interfaces 410 may enable the analytics system 108, or components of the analytics system 108, to communicate with other devices or components of the analytics system 108. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input device or output device associated with the analytics system 108. For example, I/O devices 416 may include touch sensors, keyboards, mouse devices, microphones, image sensors (e.g., cameras), scanners, displays, speakers, haptic devices, printers, positioning devices, and so forth. The positioning device may comprise one or more of a satellite radio-navigation system, inertial navigation system, terrestrial radio-navigation system, or other device configured to generate data indicative of the geolocation 310. For example, the satellite radio-navigation system may comprise a Global Positioning System (GPS) receiver, the terrestrial radio-navigation system may utilize information from the network access points 326, and so forth. In some implementations, the I/O devices 416 may be physically incorporated with the analytics system 108 or may be externally placed.

The network interfaces 414 may be configured to provide communications between the analytics system 108 and other devices, such as the I/O devices 416, routers, access points, and so forth. The network interfaces 414 may include devices configured to couple to one or more networks 312 including local area networks (LANs), WLANs, wide area networks (WANs), WWANs, and so forth. For example, the network interfaces 414 may include devices compatible with Ethernet, Wi-Fi, Bluetooth, ZigBee, Z-Wave, 3G, 4G, LTE, and so forth.

As shown in FIG. 4, the analytics system 108 may include one or more memories 418. The memory 418 may include one or more non-transitory computer-readable storage media (CRSM). The CRSM may be any one or more of an electronic storage device, a magnetic storage device, an optical storage device, a quantum storage device, a mechanical computer storage device, a solid-state memory device, and so forth. The memory 418 may provide storage of computer-readable instructions, data structures, program modules, and other data for the operation of the analytics system 108. A few example modules are shown stored in the memory 418, although the same functionality may alternatively be implemented in hardware, firmware, or as a system on a chip (SoC).

The memory 418 may include one or more operating systems (OS) 420. The OS 420 may be configured to manage hardware resource devices such as the I/O interfaces 412, the network interfaces 414, the I/O devices 416, and to provide various services to applications or modules executing on the processors 406. The OS 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; the Mac OS or iOS promulgated by Apple Inc. of Cupertino, Calif., USA; or other operating systems.

A data store 422 and one or more of the following modules may also be stored in the memory 418. The modules may be executed as foreground applications, background tasks, daemons, and so forth. The data store 422 may use a flat file, database, linked list, tree, executable code, script, or other data structure to store information. In some implementations, the data store 422 or a portion of the data store 422 may be distributed across one or more other devices including other computing devices, network attached storage devices, and so forth.

A communication module 424 may be configured to establish communications with one or more other devices using one or more of the communication interfaces 410. Communications may be authenticated, encrypted, and so forth. For example, the communication module 424 may utilize digital certificates to authenticate the identity of devices involved in the communication. For example, the communication module 424 may be configured to establish a virtual private network (VPN) connection or tunnel with the proxy host device 322.

A management module 426 may be configured to establish communications with a management server 318 through a network, such as the network 110 in FIG. 1 or the network 312(1) in FIG. 3. The management module 426 may include a deployed device data collection module 428 configured to retrieve data indicative of the operation of a deployed device 336 either from the deployed device 336 or from the management server 318. The management module 426 may further include a data correlation module 430 to correlate data received from the various sources. The data correlation module 430 may store the received data in the log data 124 within the data store 422. The log data 124 may include entropy data 126 and network data 128.

Other modules 432 may be included, which may be configured to perform a variety of functions.

The analysis module 130 may process the entropy data 126 and the network data 128 to determine data indicative of operation of the TD 102, of the AUT 112, of other devices under test, or any combination thereof. The analysis module 130 may further process the data to determine one or more patterns corresponding to repeating subsets of the entropy data 126 within a time series associated with at least one of the TDs 102. Further, the analysis module 130 may determine performance issues and the circumstances under which a particular performance issue occurred. The analysis module 130 may produce report data 134 based on the processing of the log data 124. Further, the data store 422 may include other data 436.

In some implementations, the analysis module 130 may determine a subset of data values of a first data item (e.g., an image) of a sequence of images. The analysis module 130 may further determine a first entropy value 138 for the first data item based on the subset of data values. For example, the analysis module 130 may determine a subset of data values from an image and may determine probabilities for the subset. The probabilities may represent the likelihoods that the subset of data values have a particular value. The first entropy value 138 may be determined by summing the probabilities. Other implementations are also possible.

Figure 5:
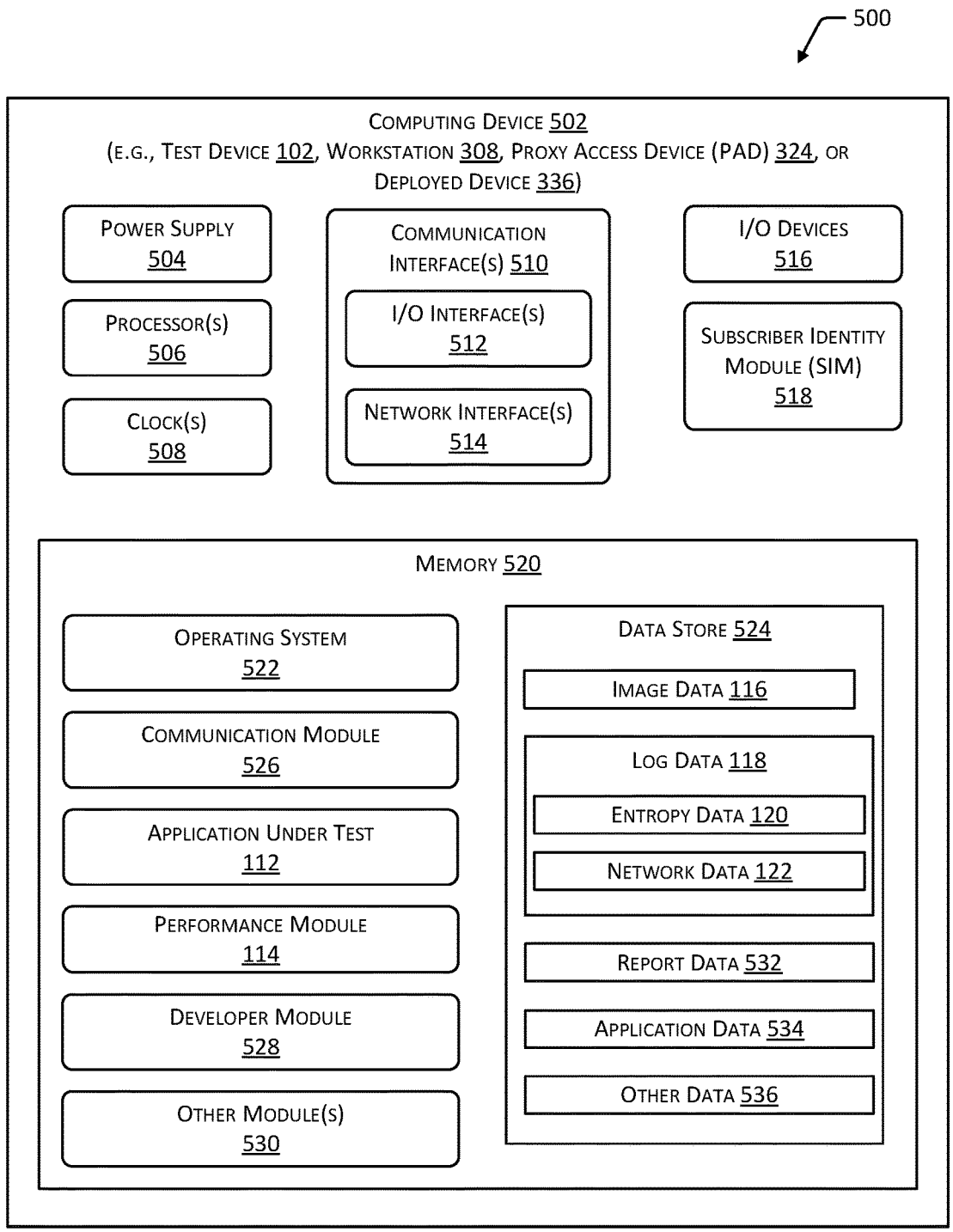
FIG. 5 depicts a block diagram of a computing device acting as a test device, a workstation, or a deployed device, according to one implementation.

FIG. 5 is a block diagram 500 illustrating a computing device 502 within the scope of the present disclosure. The computing device 502 may include one or more TDs 102, workstations 308, proxy access devices 324, deployed devices 336, or other devices. Any type of computing device 502 and any number of networked computing devices may perform the implementations described herein.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clocks 508 may provide information indicative of date, time, ticks, and so forth. For example, the processor(s) 506 may use data from the clock 508 to generate a timestamp, trigger a preprogrammed action, and so forth. The computing device 502 may include one or more buses or other internal communications hardware or software that allows for the transfer of data between the various modules and components of the computing device 502.

The computing device 502 may include one or more communication interfaces 510, such as input/output (I/O) interfaces 512, network interfaces 514, and so forth. The communication interfaces 510 may enable the computing device 502, or components of the computing device 502, to communicate with other devices or components of other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input device or output device associated with the computing device 502. For example, I/O devices 516 may include touch sensors, keyboards, mouse devices, microphones, image sensors (e.g., cameras), scanners, displays, speakers, haptic devices, printers, positioning devices, and so forth. The positioning device may comprise one or more of a satellite radio-navigation system, inertial navigation system, terrestrial radio-navigation system, or other device configured to generate data indicative of the geolocation 310. For example, the satellite radio-navigation system may comprise a Global Positioning System (GPS) receiver, the terrestrial radio-navigation system may utilize information from the network access points 326, and so forth. In some implementations, the I/O devices 516 may be physically incorporated with the computing device 502 or may be externally placed.

The network interfaces 514 may be configured to provide communications between the computing device 502 and other devices, such as the I/O devices 516, routers, access points, and so forth. The network interfaces 514 may include devices configured to couple to one or more networks 312 including local area networks (LANs), WLANs, wide area networks (WANs), WWANs, and so forth. For example, the network interfaces 514 may include devices compatible with Ethernet, Wi-Fi, Bluetooth, ZigBee, Z-Wave, 3G, 4G, LTE, and so forth.

The computing device 502 may include a subscriber identity module (SIM) 518. For example, the TD 102 and the deployed device 336 may include SIMs 518. The SIM 518 may comprise a non-transitory computer-readable storage media that may store information such as an international mobile subscriber identity (IMSI) number, cryptographic keys, integrated circuit card identifier (ICCID), contact information, or other data. The SIM 518 may be used by the network interface 514 for communication with one or more of the networks 312. For example, the IMSI and cryptographic keys stored in the SIM 518 may be retrieved and used to establish communication with a WCDN.

As shown in FIG. 5, the computing device 502 may include one or more memories 520. The memory 520 may include one or more non-transitory computer-readable storage media (CRSM). The CRSM may be any one or more of an electronic storage device, a magnetic storage device, an optical storage device, a quantum storage device, a mechanical computer storage device, a solid-state storage device, and so forth. The memory 520 may provide storage of computer-readable instructions, data structures, program modules, and other data for the operation of the computing device 502. A few example modules are shown stored in the memory 520, although the same functionality may alternatively be implemented in hardware, firmware, or as a system on a chip (SoC).

The memory 520 may include one or more operating system (OS) 522. The OS 522 may be configured to manage hardware resource devices such as the I/O interfaces 512, the network interfaces 514, the I/O devices 516, and to provide various services to applications or modules executing on the processors 506. The OS 522 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; the Mac OS or iOS promulgated by Apple Inc. of Cupertino, Calif., USA; or other operating systems.

A data store 524 and one or more of the following modules may also be stored in the memory 520. The modules may be executed as foreground applications, background tasks, daemons, and so forth. The data store 524 may use a flat file, database, linked list, tree, executable code, script, or other data structure to store information. In some implementations, the data store 524 or a portion of the data store 524 may be distributed across one or more other devices including other computing devices 502, network attached storage devices, and so forth.

A communication module 526 may be configured to establish communications with one or more other devices using one or more of the communication interfaces 510. Communications may be authenticated, encrypted, and so forth. For example, the communication module 526 may utilize digital certificates to authenticate the identity of devices involved in the communication. For example, the communication module 526 may be configured to establish a virtual private network (VPN) connection or tunnel with the proxy host device 322.

The memory 520 may store the AUT 112. As described above, in some implementations, the AUT 112 may incorporate at least a portion of a software development kit (SDK). Elements of the SDK may be configured to execute on the one or more hardware processors 506. These elements may execute within a user space, as compared to a kernel space, of an operating system 522 executing on the computing device 502. For example, the AUT 112 and the elements of the SDK may execute with privileges of a user account, with the first user account having privileges within the OS 522 that are lesser than a root account, superuser, administrator, or other types of elevated accounts.

In some embodiments, the SDK may be configured to direct the AUT traffic 314 to and from a particular network address. For example, the SDK may be configurable to intercept the outbound application traffic and direct that traffic to the selected proxy host device 322. In one implementation, the SDK may implement or call on VPN functionality, such as provided by the communication module 526. For example, the SDK may issue a request to the communication module 526 to establish an encrypted tunnel to the proxy host device 322. Once established, the AUT traffic 314 may be directed through the VPN to the proxy host device 322.

A performance module 114 in the memory 520 may monitor operation of the AUT 112. The performance module 114 may determine entropy values 138 indicative of the distribution of data values within selected data items of a plurality of data items. The performance module 114 may determine data indicative of performance of the AUT 112, the computing device 502, the network throughput, or any combination thereof based on the entropy values 138. In some instances, the data indicative of performance may be based on the performance of some other system, such as a delay in a webserver responding.

In an example, the performance module 114 may determine a first entropy value 138 for a first image of a sequence of images and a second entropy value 138 for a second image of the sequence of images. The performance module 114 can determine data indicative of performance of the computing device 502 or of the AUT 112 based on the first entropy value 138 and the second entropy value 138. The performance module 114 may process the image data 116 to determine the entropy values 138. Further, the performance module 114 may store the entropy data 120 and network data 122 in the log data 124. Further, the performance module 114 may generate report data 532, which may be stored in the data store 524 and optionally sent to another computing device for review.

In one example, when entropy values 138 of the sequence of images do not change for a pre-determined period, a latency interval 144 may be identified. In some instances, sinusoidal or repeating variations in the entropy values 138 within the latency interval 144 may correspond to a loading indicator 106.

In another example, when entropy values 138 of a subset of a sequence of images represents a pattern that repeats over a time series, the pattern may be correlated to input data, application code, or other operational parameters to detect a signature indicative of an input. For example, a first subset may be processed to determine first entropy values 138, and a second subset may be processed to determine second entropy values 138. A pattern may be determined based on repeating subsets of entropy values 138 over a time series. Alternatively, the pattern may be determined from historical data. Other embodiments are also possible.

A developer module 528 may be stored in the memory 520. The developer module 528 may comprise one or more of an integrated development environment, build systems, and so forth. For example, the developer module 528 may include Xcode from Apple Inc., Android Studio from Google Inc., Gradle as promulgated at www.gradle.org, Jenkins as promulgated at www.jenkins-ci.org, Travis CI as promulgated at www.travis-ci.org, Perforce from Perforce Software, Inc., and so forth.

Other modules 530 may also be present in the memory 520. In some implementations, one or more of the modules may be stored at least in part in the memory 520 of other devices, may be executed at least in part on the other devices, and so forth. For example, one or more functions associated with the developer module 528 may execute on a server.

Various information used by the computing device 502 may be stored in the data store 524. For example, application data 534 may be stored in the data store 524 and may comprise information associated with operation of modules such as the AUT 112, the developer module 528, and so forth. Other data 536 may also be stored in the data store 524. Other data 536 may include test configuration data including information associated with testing of a device. For example, the test configuration data may specify the second geolocation 310(2) selected by the developer 302 that will be used for network testing, network address of the proxy host device 322, credentials to access the proxy host device 322, costs associated with access to the proxy access device 324, or information from the management server 318 about the proxy host device 322, proxy access device 324, and so forth. Additionally, the other data 536 may include one or more threshold values. For example, the threshold values may include latency times that, when exceeded, result in an alert in the report data 532. Threshold values may also include maximum values, minimum values, ranges of values, and so forth.

In different implementations, different computing devices 502 may have different capabilities or capacities. For example, a workstation 308 may have significantly more processor 506 capability and memory 520 capacity compared to the processor 506 capability and memory 520 capacity of the TD 102 or deployed device 336.

Figure 6:
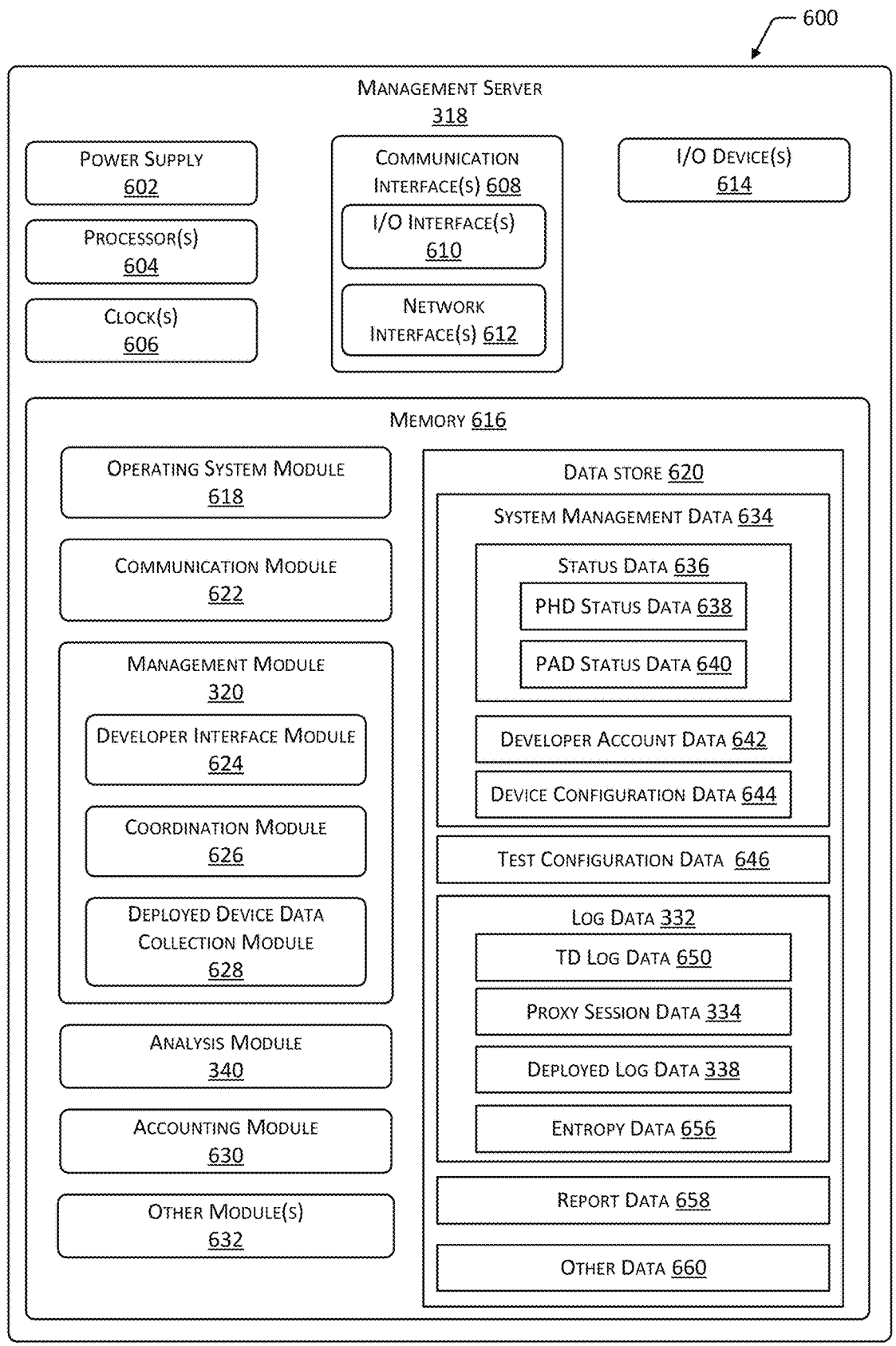
FIG. 6 depicts a block diagram of a computing device acting as a management server, according to one implementation.

FIG. 6 is a block diagram 600 of a computing device acting as a management server 318 within the scope of the present disclosure, according to one implementation. The management server 318 may provide functionality such as coordinating communication between an AUT 112 and the proxy access devices 324 that are connected to proxy host devices 322.

Similar to the analytics system 108 described above with regard to FIG. 4, the management server 318 may include one or more of: power supplies 602, hardware processor(s) 604 (processors), clocks 606, or communication interfaces 608. The communication interface 608 may include I/O interfaces 610, network interfaces 612, and so forth.

The I/O interface(s) 610 may couple to one or more I/O devices 614. The I/O devices 614 may include any manner of input device or output device, such as described above with regard to FIG. 4. In some implementations, the I/O devices 614 may be physically incorporated with the management server 318 or may be externally placed.

The network interfaces 612 may be configured to provide communications between the management server 318 and other devices. As described above with regard to FIG. 4, the network interfaces 612 may include devices configured to couple to one or more networks 312.

The management server 318 may include one or more buses or other internal communications hardware or software that allows for the transfer of data between the various modules and components of the management server 318.

As shown in FIG. 6, the management server 318 may include one or more memories 616, such as described above with regard to FIG. 4. The memory 616 may include one or more non-transitory CRSM. The memory 616 may provide storage of computer-readable instructions, data structures, program modules, and other data for the operation of the management server 318. A few example modules are shown stored in the memory 616, although the same functionality may alternatively be implemented in hardware, firmware, or as a SoC.

The memory 616 may include an OS module 618, such as described above with regard to FIG. 4.

A data store 620 and one or more of the following modules may also be stored in the memory 616. The modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including other computing devices, network attached storage devices, and so forth.

A communication module 622 may be configured to establish communications with one or more other devices using one or more of the communication interfaces 608. Communications may be authenticated, encrypted, and so forth. For example, the communication module 622 may utilize digital certificates to authenticate the identity of devices involved in the communication.

The memory 616 may store the management module 320. The management module 320 may include one or more of a developer interface module 624, coordination module 626, deployed device data collection module 628, and so forth. The analysis module 340, an accounting module 630, or other modules 632 may also be present in the memory 616.

The developer interface module 624 provides interface functionality to the developer 302 or applications used by the developer 302. For example, the developer interface module 624 may present a user interface for the developer 302 to select a particular proxy access device 324, or may comprise an application programming interface (API) that the SDK may use to access one or more of the functions of the management server 318. In some implementations, at least a portion of the developer interface module 624 may be provided as part of the SDK or may be integrated within the AUT 112.

The coordination module 626 is configured to coordinate various functions of the system 300. The coordination module 626 may be configured to access system management data 634 stored in the data store 620 to direct operation of the system 300. The system management data 634 may include status data 636, such as proxy host device (PHD) status data 638, proxy access device (PAD) status data 640, and so forth. The PHD status data 638 may comprise information such as a network address, operational status, information indicative of installed software, version of installed software, current utilization, and so forth. The PAD status data 640 may comprise information such as make and model of the proxy access device 324, OS version of the proxy access device 324, connection status to the second network 312(2), whether the proxy access device 324 is currently in use by another AUT 112, and so forth.

The system management data 634 may also include developer account data 642. The developer account data 642 may include information such as individual account logins and passwords, billing information, usage information, and so forth.

The system management data 634 may also include device configuration data 644. The device configuration data 644 may comprise instructions, applications, modules, and so forth, that may be used to configure one or more of the proxy host device 322 or the proxy access device 324. For example, the device configuration data 644 may include one or more scripts that may be executed by the proxy host device 322 to send instructions to the proxy access device 324. These instructions may configure the proxy access device 324 to transfer data between the proxy host device 322 and the second network 312(2).

The data store 620 may also store test configuration data 646, such as described above. In some implementations, the management server 318 may generate at least a portion of the test configuration data 646. The generation of the test configuration data 646 may be based at least in part on information provided by the developer 302. For example, the developer 302 may use the developer interface module 624 to specify parameters such as different types of test parameters, alarm limits, test thresholds, and so forth. Based on these parameters, the management module 320 may generate the test configuration data 646. In some implementations, test configuration data 646 may be modified by the developer 302, or may be generated entirely by the developer 302 or another device or entity.

Returning to the coordination module 626, the system management data 634 and test configuration data 646 may be used to provide testing functionality to the developer 302. For example, the developer 302 may use the developer interface module 624 to request testing services for the AUT 112. The coordination module 626 may assess the status data 636 to determine information such as geolocations 310, types of networks, and so forth, that are available for use. Based on this determination, the coordination module 626 may present information to the developer 302 by way of the developer interface module 624. For example, the information may indicate those geolocations 310 and proxy access devices 324 that are available for testing, cost associated with using those resources, and so forth.

Responsive to a selection by the developer 302, or predefined defaults, the coordination module 626 may coordinate establishment of a connection between the TD 102 and the proxy access device 324 such that AUT traffic 314 from the AUT 112 is directed through the proxy access device 324 and the second network 312(2) to reach the destination device. For example, responsive to the selection within a user interface by the developer 302, the AUT 112 may receive a network address and credentials associated with the proxy host device 322 at the selected second geolocation 310(2). The AUT 112 may use the network address and credentials to establish a connection with the proxy host device 322. The AUT traffic 314 may thus be exchanged directly between the AUT 112 that is executing on the TD 102 or the workstation 308 and the proxy host device 322. In another implementation, the management server 318 may act as an intermediary relaying the AUT traffic 314 between the AUT 112 and the proxy host device 322.

The coordination module 626 may be configured to acquire the log data 332. For example, the coordination module 626 may establish a connection with the TD 102 or with an analytics system 108 to receive TD log data 650. The coordination module 626 may establish a connection with the proxy host device 322 to receive an ongoing stream of proxy session data 334. The stream of proxy session data 334 may be received in real time or near real time while the developer 302 is testing the AUT 112. For example, proxy session data 334 may be sent every five seconds to the management server 118.

In some implementations, the log data 332 may include the TD log data 650. For example, the SDK or lines of code embedded in the AUT 112 may send the TD log data 650 to the management server 318.

The deployed device data collection module 628 may be configured to communicate with the deployed devices 336 and obtain the deployed log data 338. The deployed device data collection module 628 may be configured to receive the deployed log data 338 in real time or near real time during use of the AUT 112. For example, the deployed log data 338 may be generated while the AUT 112 executing on the deployed device 336 is exchanging AUT traffic 314 with the destination device by way of a particular network 312 at a particular geolocation 310. The deployed log data 338 may be used by the management server 318 to determine if the AUT 112 is experiencing problems on the particular network 312, at the particular geolocation 310, and so forth.

The log data 332 may also include entropy data 656 corresponding to entropy values 138 from one or more of the TDs 102, one or more of the proxy access devices 324, and one or more deployed devices 336.

As described above, the analysis module 340 may be configured to use information stored in the data store 620 to generate report data 658. For example, the analysis module 340 may analyze the log data 332 to determine if there are particular WCDNs or parts of a city where the AUT 112 experiences problems using the resources of the destination device.

The accounting module 630 may be configured to determine and assess charges associated with the use of the system 300, provide remuneration to operators of the proxy access devices 324, and so forth. For example, the accounting module 630 may provide the developer 302 with a cost to use the particular proxy access device 324 at a particular geolocation 310 for a certain amount of time, quantity of data transferred, and so forth. In some implementations, a user may join their mobile device to the system and allow that mobile device to act as a proxy access device 324. For example, during a time of day when the user is not otherwise using their cell phone, they may tether their cell phone to a proxy host device 322 and allow the use of that cell phone as a proxy access device 324. During such use, data associated with the user that is stored on the cell phone may be secured, other applications executing on the cell phone may be terminated, and so forth. These and other measures may be taken to safeguard the security of the data of the user, to prevent an application executing on the cell phone from affecting the results of the test, and so forth. In return for allowing this use, the user may receive remuneration. For example, where the user is a developer 302, the developer 302 may receive a credit on their account. That credit may be used to run tests using a proxy access device 324 associated with another developer 302. In other implementations, the remuneration may comprise a financial transfer such as payment in the form of currency.

In some implementations, one or more of the modules may be stored at least in part in the memory of other devices, may be executed at least in part on the other devices, and so forth. For example, one or more functions associated with the accounting module 630 may execute on another server.

Other data 660 within the data store 620 may include information such as configurations and settings associated with the management server 318 or modules thereof.

Figure 7:
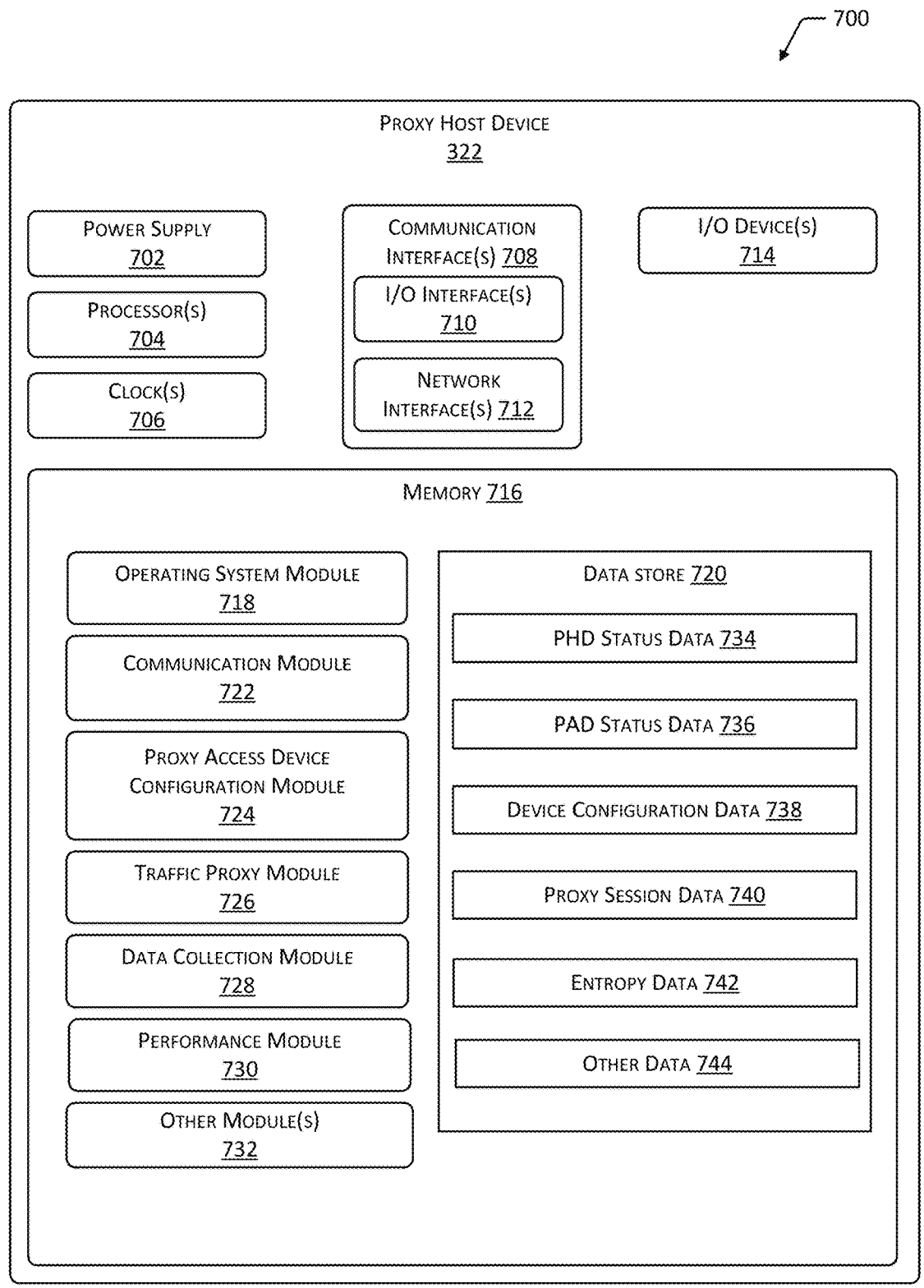
FIG. 7 depicts a block diagram of a computing device acting as a proxy host device, according to one implementation.

FIG. 7 is a block diagram 700 of a computing system acting as a proxy host device 322 within the scope of the present disclosure, according to one implementation. The proxy host device 322 may be implemented using a variety of different types of computing devices. For example, a proxy host device 322 may comprise a mini desktop computer, a tablet computer, a server, and so forth.

Similar to that described above with regard to FIGS. 4 and 6, the proxy host device 322 may include one or more of: power supplies 702, hardware processor(s) 704 (processors), clocks 706, or communication interfaces 708. The communication interface 708 may include I/O interfaces 710, network interfaces 712, and so forth.

The I/O interface(s) 710 may couple to one or more I/O devices 714. The I/O devices 714 may include any manner of input device or output device, such as those described above with regard to FIGS. 4 and 6. In some implementations, the I/O devices 714 may be physically incorporated with the proxy host device 322 or may be externally placed.

The network interfaces 712 may be configured to provide communications between the proxy host device 322 and other devices. As described above with regard to FIGS. 4 and 6, the network interfaces 712 may include devices configured to couple to one or more networks 312.

The proxy host device 322 may include one or more buses or other internal communications hardware or software that allows for the transfer of data between the various modules and components of the proxy host device 322.

As shown in FIG. 7, the proxy host device 322 may include one or more memories 716, such as described above with regard to FIG. 4. The memory 716 may include one or more non-transitory CRSM. The memory 716 may provide storage of computer-readable instructions, data structures, program modules, and other data for the operation of the proxy host device 322. A few example modules are shown stored in the memory 716, although the same functionality may alternatively be implemented in hardware, firmware, or as a SoC.

The memory 716 may include an OS module 718, such as described above with regard to FIG. 4.

A data store 720 and one or more of the following modules may also be stored in the memory 716. The modules may be executed as foreground applications, background tasks, daemons, and so forth. The data store 720 may use a flat file, database, linked list, tree, executable code, script, or other data structure to store information. In some implementations, the data store 720 or a portion of the data store 720 may be distributed across one or more other devices including other computing devices, network attached storage devices, and so forth.

A communication module 722 may be configured to establish communications with one or more other devices using one or more of the communication interfaces 708. Communications may be authenticated, encrypted, and so forth. For example, the communication module 722 may utilize digital certificates to authenticate the identity of devices involved in the communication. For example, the communication module 722 may be configured to establish a VPN connection or tunnel with one or more of the TD 102, the workstation 308, or the management server 318.

The memory 716 may store one or more of a proxy access device (PAD) configuration module 724, a traffic proxy module 726, a data collection module 728, a performance module 730, or other modules 732.

The PAD configuration module 724 is configured to send one or more instructions or commands to the proxy access devices 324 that are connected to the proxy host device 322. These instructions may be provided as part of the device configuration data 738 received from the management server 318. These instructions may be designed to enable the proxy access device 324 to send and receive traffic on the second network 312(2), provide information such as the PAD status data 736, and so forth. For example, the PAD configuration module 724 may send and execute a local traffic module and a local status module to the proxy access device 324. For example, the PAD configuration module 724 may utilize the Ansible software platform as developed by Michael DeHaan and promulgated at www.ansible.com.

The traffic proxy module 726 is configured to pass the AUT traffic 314 between the TD 102 that is executing the AUT 112 and the proxy access device 324. For example, where the proxy host device 322 utilizes the Linux OS, the Linux proxy service may be used. The traffic proxy module 726 may be configured to connect otherwise dissimilar types of interfaces. For example, the proxy host device 322 may use a network interface 712 to connect the first network 312(1) and a USB I/O interface 710 to connect to (or tether) the proxy access device 324. Once connected, the USB connection to the proxy access device 324 may be presented in the OS module 718 as a network interface 712 through which traffic may be routed.

The connection or tethering between the proxy host device 322 and the proxy access device 324 may be wireless in some implementations. For example, the proxy host device 322 and proxy access device 324 may be in communication with one another using a Bluetooth wireless interface.

The data collection module 728 may be configured to obtain one or more of the PHD status data 734, the PAD status data 736, the device configuration data 738, the proxy session data 740, entropy data 742, other data 744, or any combination thereof. It should be appreciated that the PHD status data 734 from multiple PHDs 322 may be aggregated by the management server 318 to form the PHD status data 638. The PAD status data 736 from multiple PHDs 322 may be aggregated by the management server 318 to form the PAD status data 640. Further, the device configuration data 738, the proxy session data 740, the entropy data 742, and the other data 744 from multiple PHDs 322 may be aggregated by the management server 318 to form the test configuration data 646, the proxy session data 334, the entropy data 656, and a part of the other data 660, respectively. For example, the data collection module 728 may obtain packet captures of the AUT traffic 314 that is being transferred between the proxy host device 322 and the proxy access device 324. Packet captures may be included in the proxy session data 334. For example, the TCPDUMP library promulgated by www.tcpdump.org may be used to acquire the packet captures. As described above, the proxy session data 334 may be sent to one or more of the management server 318, to the TD 102, the workstation 308, or other devices.

One or more of the modules may execute in the user space of the OS module 718. For example, one or more of the proxy access device configuration module 724, the traffic proxy module 726, or the data collection module 728 may execute using the account privileges associated with a user space of the OS module 718. In comparison, the OS module 718 may provide for accounts that provide additional privileges or levels of access, such as a root account, superuser, administrator, and so forth.

In some implementations, one or more of the modules may be stored at least in part in the memory 716 of other devices, may be executed at least in part on the other devices, and so forth.

Other data 744 within the data store 720 may include information such as configurations and settings associated with the proxy host device 322 or modules thereof.

The entropy data 742 within the data store 720 may include time series entropy information received from one or more PADs 324. The PHD 322 may process the entropy data 742 to determine data indicative of performance of one or more of the PADs 324 based on the entropy values 138. It should be appreciated that the data indicative of performance may be based on the performance of some other system, such as a delay in a webserver responding. The PHD 322 may communicate the data indicative of performance to the management server 318, to the analytics system 108, or both.

How Low Page Content is Detected

The entropy time series provides a convenient qualitative tool for analyzing page transitions in video data, audio data, or multimedia data (i.e., video, audio, text, or any combination thereof). It is also desirable to quantitatively describe characteristics of this curve. For example, studies done at Google suggest that users who wait for content more than one second mentally disengage from the task they are focusing on. This common performance issue in mobile apps may be captured from the entropy time series of a recorded application session. The simplest approach may include setting a threshold in entropy and time. For example, a normalized entropy value of less than 0.45 for a period of time that is greater than a time threshold, such as one second or more, may be a robust indicator of data that may be indicative of an adverse user experience for many applications. In other examples, fixed or dynamic thresholds may be configured using optimization techniques or machine learning. Other desired video transition behaviors may be captured similarly. For example, certain spinners change in size, shape, or other properties with a fixed periodicity. The entropy time series may reflect these changes as small periodic fluctuations, which can be analyzed and identified using analytic techniques.

How Network Activity is Merged with Entropy

Network traffic and content displayed on an application or web page are fundamentally connected. The user interface cannot display information it does not have, and network connections provide the means for retrieving information requested by an application. The entropy time series may be integrated with video playback, network traffic, and other data sources through a common timeline. This timeline may contain the full data or be filtered to show a selected subset of the data for each data source. For example, it may be desirable to understand the performance of a single request. The timeline may be filtered to the relevant timeframe of the request, and data sources may be filtered by explicitly or implicitly defined features to select the relevant data.

Entropy Time Series as a Gateway for Detecting Performance Issues

Merging network traffic and other data sources into the timeline of the entropy time series allows for deep insight into the root causes of user-visible performance issues. For example, a low page content performance issue may highlight regions of the timeline where content failed to be displayed on the screen for long periods of time. The network traffic often shows slow server connections and slow content downloads before and during the highlighted region of the timeline. Multiple replications of the test on the same device and on other devices in a distributed device cloud may reveal whether the slow server connection is due to network issues, a single server configuration, or a broader issue in content delivery. Thus, the entropy time series may be a valuable tool for comparing and diagnosing user-visible content issues both within a single test session and in aggregate comparisons between distinct test environments.

One possible example of a timeline merging entropy values 138 and network throughput values is described below with respect to FIG. 8.

Figure 8:
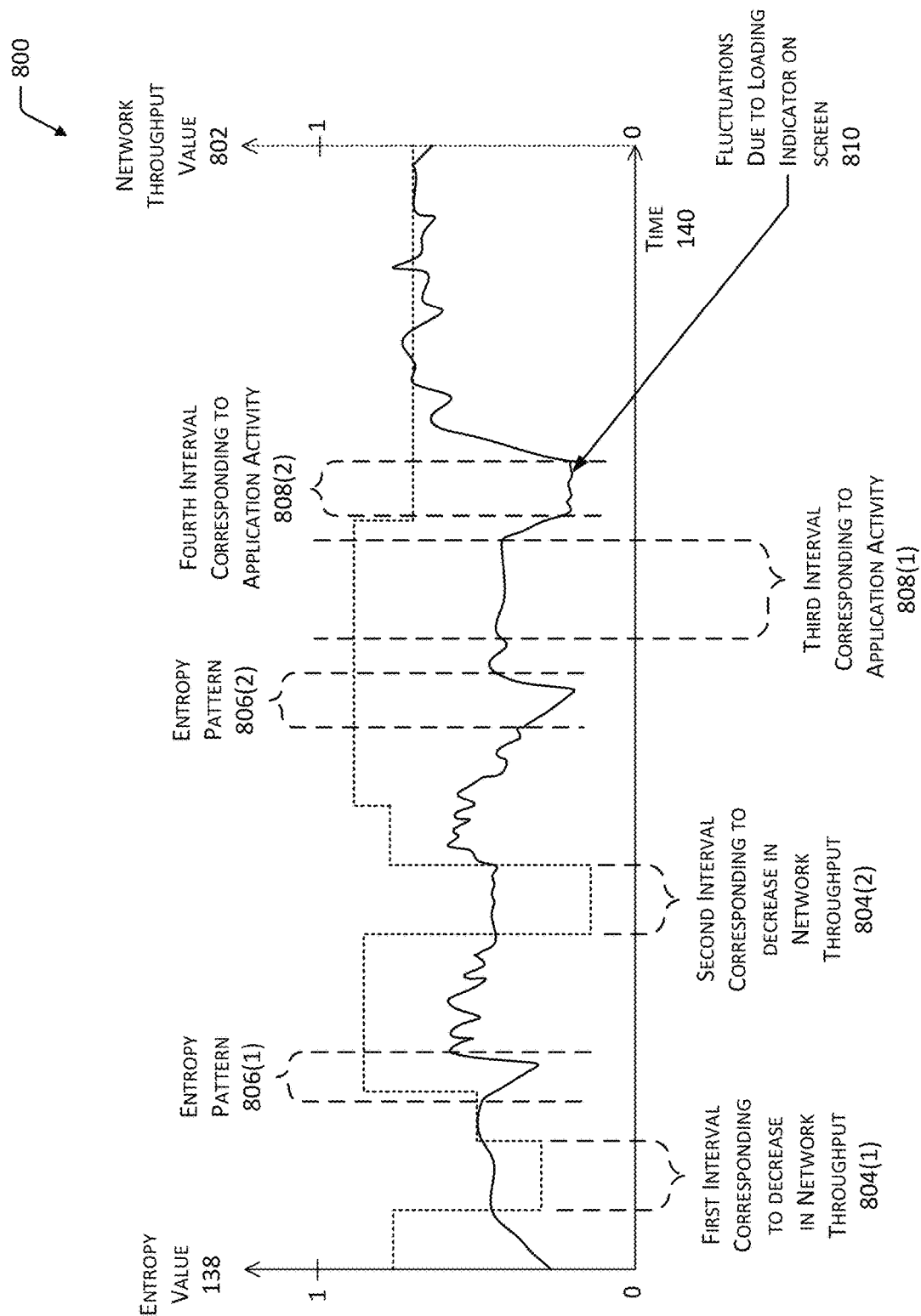
FIG. 8 depicts a graph of entropy and network throughput versus time within the scope of the present disclosure, according to one implementation.

FIG. 8 depicts a graph 800 of entropy values 138 and network throughput values 802 versus time 140, according to one implementation. In the graph, the entropy value 138 is represented by a solid line, while the network throughput value 802 is represented by a dotted line. In this example, the network throughput values 802 and the entropy values 138 are presented on a common timeline.

In the graph 800, a first interval 804(1) may correspond to a decrease in network throughput. Similarly, a second interval 804(2) may correspond to a decrease in network throughput. For example, network throughput may have decreased due to network congestion, an outage, or some other factor. The network throughput values 802 may be determined from a network transceiver of the TD 102, the PAD 324, or the deployed device 336.

In the graph 800, the time series data may include a repeating sequence of entropy values 138, such as entropy pattern 806(1) and entropy pattern 806(2). It should be appreciated that the entropy pattern 806 may have different amplitudes at different points in the time series, but may share a similar shape, such as a similar slope. In this example, the entropy pattern 806 may be characterized by a linearly decreasing entropy value 138 from a first time to a second time followed by an impulse or rapid increase in entropy values 138 from a third time to a fourth time. In one implementation, the time between the first time and the second time may be longer than the time between the third time and the fourth time. In one possible example, the entropy pattern 806 may represent the behavior of an application in response to a particular input, such as a "swipe right" input. As an image is "swiped" from the display 104 by a user interaction, the entropy data 120 associated with the display 104 may decrease in conjunction with the input and then may increase rapidly as a new image is loaded. In another example, such a pattern may emerge each time an application calls a particular function, and the pattern may be indicative of code that may need to be reviewed or may correspond to expected operation of the application. Other embodiments are also possible.

The graph 800 may also include a third interval 808(1) corresponding to application activity during a time interval where the network throughput value 802 is relatively high. The graph 800 may also include a fourth interval 808(2) corresponding to application activity during a time interval where the network throughput value 802 is relatively high, though lower than the network throughput value 802 during the third interval 808(1). During the fourth interval 808(2), fluctuations 810 in the entropy value 138 may be due to the presence of a loading indicator 106 on the screen or display 104.

In one possible implementation, differences between entropy values 138 of a subset of the sequence of images may be determined. For example, a difference in entropy values 138 between a first image and a second image, the second image and a third image, and so on may be determined. The subset of the sequence of images may include selected images of the sequence. In this example, the differences may reflect changes in entropy values 138 from image to image. A relatively high latency indicative of poor performance of the computing device may be determined when the differences are less than a difference threshold. For example, little or no change in entropy values 138 from image to image and through a subset of images may indicate that the information content on the display 104 is not changing and may be frozen. In some implementations, the difference threshold may be determined from data patterns that correspond to periods of low or no information content provided to the display 104. Other implementations are also possible.

It should be understood that analysis of the time-series entropy values 138 and network throughput values 802 may reveal programmatic problems, network problems, or both. Further, analysis of the entropy values 138 in conjunction with the network throughput values 802 may reveal data patterns attributable to application behavior, attributable to input data, or attributable to other sources. Identified patterns may be used by the developer 302 to refine the application code to improve performance and optionally to verify expected performance. Other embodiments are also possible.

The following code sample demonstrates a method of calculating the entropy value 138 for each image or frame in a video. Other implementations may calculate the entropy value 138 for one or more images or frames in the video.

Video Entropy Example Code

```
" " "
Video Analysis
" " "
from _—future_— import division
import numpy as np
import cv2
DEFAULT_ENTROPY_PRECISION = 4
# Video entropy metric analysis
def entropy(array, nbins=256):
    " " "Calculate entropy of a grayscale image array.
    Parameters
    ----------
    array : array-like
        The grayscale image array.
    nbins : int, optional (default: 256)
        The number of possible values supported by the data type.
        Grayscale uint8 images support 256 possible values per
pixel.
    Returns
    -------
    entropy : float
        The array entropy.
    " " "
    n = array.size
    if n < 2:
        return 0
    # NOTE: np.bincount returns frequency counts of an array of non-
negative
    # ints returned length will be maxint(array) + 1.
    counts = np.bincount(array.ravel( ))
    probs = counts / n
    # avoid nan or inf due to 0*log(0)
    probs = probs[probs > 0]
    # adjust entropy for short arrays
    base = min(n, nbins)
    # NOTE: log_base<256>(array) =
log_base<x>(array)/log_base<x>(256)
    return np.sum(−probs * np.log(probs)/np.log(base))
def calculate_video_entropy(frame_generator):
    " " "Calculate entropy for each frame in a video.
```

-continued

```
Parameters
----------
frame_generator: generator or iterator
    This object should yield video frames as NumPy uint8 arrays.
Returns
-------
entropy_values: array
    The entropy metric per video frame.
" " "
entropy_values = np.zeros(len(frame_generator))
for idx, frame in enumerate(frame_generator):
    # convert frame to grayscale
    frame = cv2.cvtColor(frame, cv2.COLOR_RGB2GRAY)
    # calculate frame entropy
    entropy_values[idx] = round(entropy(frame),
DEFAULT_ENTROPY_PRECISION)
    return entropy_values
```

This system thus provides a method of determining information indicative of operation of a device based at least in part upon the entropy of data associated with presentation by the device. This data may be used to assess the operation of particular applications, operating systems, and so forth. The entropy data 120 may be used in other ways as well, as one of ordinary skill in the art would recognize.

Figure 9:
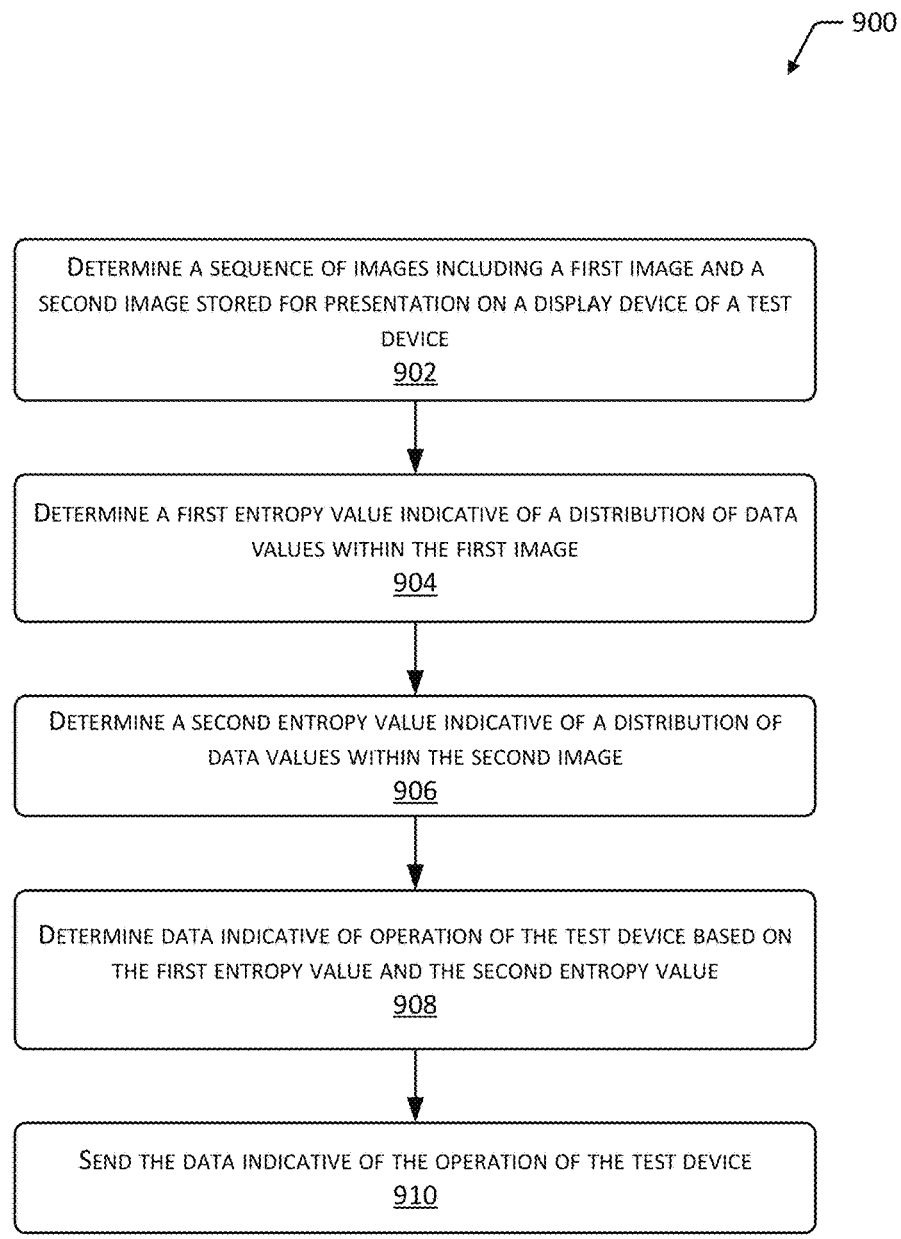
FIG. 9 depicts a flow diagram of a method of determining data indicative of operation of a test device based on entropy values within the scope of the present disclosure, according to one implementation.

FIG. 9 depicts a flow diagram 900 of a method of determining data indicative of operation of a test device 102 based on entropy values 138 within the scope of the present disclosure, according to one implementation. The method may be performed by the TD 102, the analytics system 108, the workstation 308, the management server 318, the PHD 322, the PAD 324, the deployed device 336, another device, or any combination thereof.

At 902, a sequence of images is determined that includes a first image and a second image stored for presentation on a display 104 device of a TD 102. For example, the sequence of images may be retrieved from a display buffer or cache memory of a mobile computing device.

At 904, a first entropy value 138 is determined that may be indicative of a distribution of data values within the first image. In some embodiments, the first entropy value 138 may be determined by determining probabilities for each data value comprising the first image and summing the determined probabilities to calculate the first entropy value 138.

At 906, a second entropy value 138 is determined that may be indicative of a distribution of data values within the second image. In some embodiments, the second entropy value 138 may be determined in the same manner as that used to determine the first entropy value 138.

At 908, data indicative of performance of the TD 102 is determine based on the first entropy value 138 and the second entropy value 138. Depending on the implementation, the TD 102 or the analytics system 108 may determine the data indicative of the performance. The data indicative of performance may include a pattern of entropy values 138 associated with a subset of the images that is repeated within the sequence of images over time. In other implementations, the data indicative of performance may include a substantially static average entropy value 138 over a period of time, which may define a latency interval 144 during which low information is provided to a display 104 of the TD 102. In some instances, a loading indicator 106 may be presented to the display 104. In one possible implementation, a latency interval 144 may be determined when the period of time exceeds a time threshold. The entropy value 138 may fluctuate periodically, which may be indicative of a looped animation of a loading indicator 106 presented on the display 104, such as a spinner. In other implementations, the entropy value 138 may vary aperiodically. In some implementations, the loading indicator 106 may be asymmetrical and may change aperiodically, which may be reflected as an aperiodic variation in the entropy value 138.

At 910, the data indicative of performance of the test device 102 may be sent. The data may be sent to a data store. The data may indicate poor performance of the test device 102 itself or an application executing on a processor of the test device. Alternatively or in addition, the data may be sent to a computing device via a wired or wireless communication link. In one example, the data may be sent to the computing device through a network 312.

Figure 10:
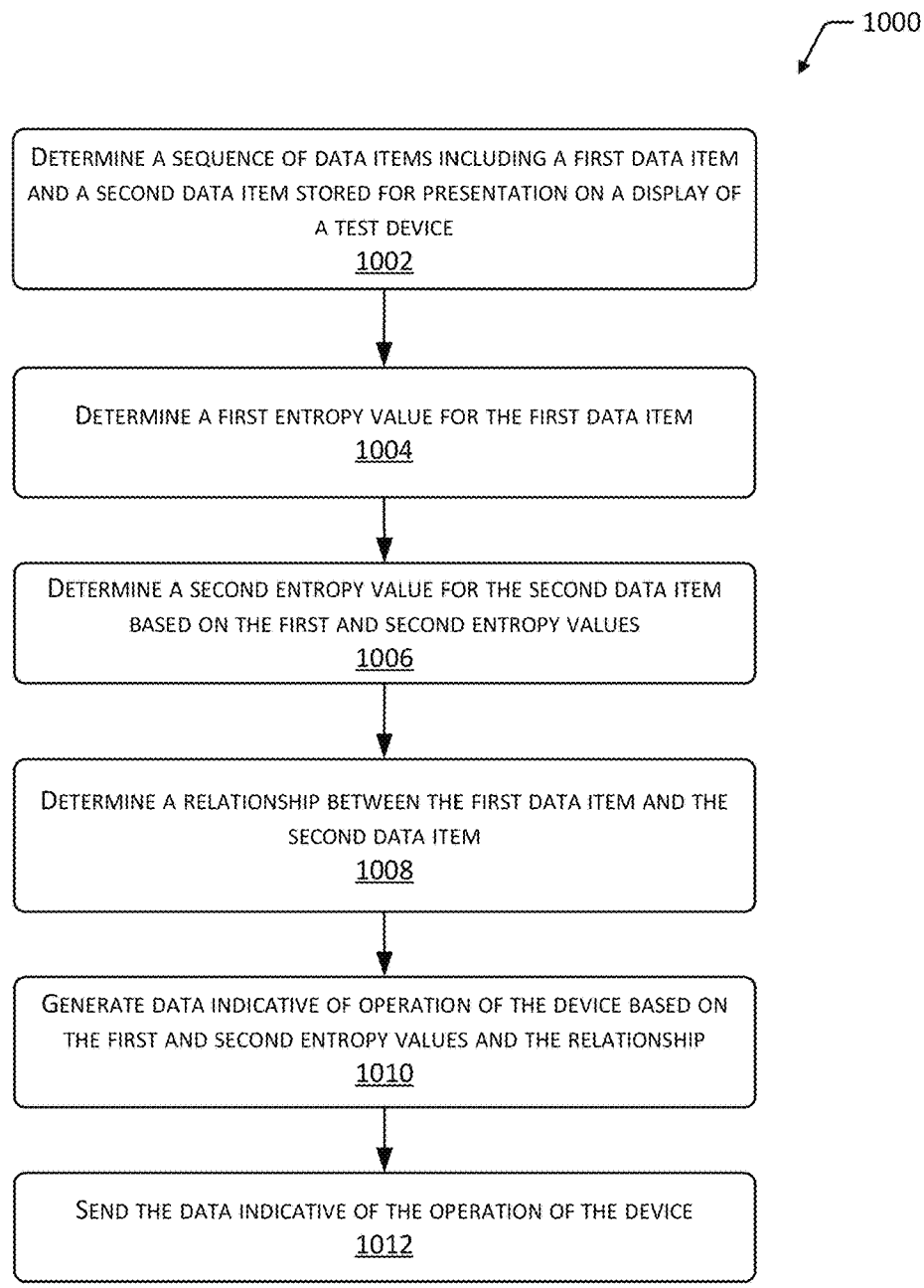
FIG. 10 depicts a flow diagram of a method of determining data indicative of operation of a test device based on entropy values within the scope of the present disclosure, according to one implementation.

FIG. 10 depicts a flow diagram 1000 of a method of determining data indicative of operation of a test device 102 based on entropy values 138 within the scope of the present disclosure, according to one implementation. The method may be performed by the TD 102, the analytics system 108, the workstation 308, the management server 318, the PHD 322, the PAD 324, the deployed device 336, another device, or any combination thereof.

At 1002, a sequence of data items including a first data item and a second data item may be determined that are stored for presentation on a display 104 device of a test device 102. For example, the first data item and the second data item may be image data, audio data, haptic output data, and so forth.

At 1004, a first entropy value 138 is determined for the first data item. In some embodiments, the first entropy value 138 may be determined by determining probabilities for each of a plurality of data values comprising the first image and summing the probabilities to produce the first entropy value 138. In some implementations, the TD 102 may determine the first entropy value 138.

At 1006, a second entropy value 138 is determined for the second data item. The TD 102 may determine the second entropy value 138. In some embodiments, the second entropy value 138 may be determined in the same manner as the first entropy value is calculated.

At 1008, a relationship between the first data item and the second data item is determined based on the first and second entropy values 138. For example, the relationship may include a delta or difference between data items of a subset of the sequence of data items. The relationship may be determined by the TD 102 or by the analytics system 108. During a latency interval 144 of static or low information presented to a display 104, the entropy values 138 may have a substantially constant average entropy value 138, representative of the TD 102, the PAD 324, or the deployed device 336 loading data. In this example, the relationship may indicate similar entropy values 138. Other embodiments are also possible.

In an alternative embodiment involving a pattern corresponding to a repeating subset of entropy values 138, the difference between adjacent images in a sequence of images (or between adjacent data items) may define a slope that can be used to detect the pattern in the time-series. The term "adjacent" in this example refers to images of a sequence of images that follow one after another in the sequence. Adjacent images are not necessarily part of a large image. If the images are sequentially numbered for reference purposes, a fifth image would be adjacent to both a fourth image and a sixth image in the sequence. Other embodiments are also possible.

At 1010, data indicative of performance of the device is generated based on the first and second entropy values 138 and the relationship. The data may be generated by the TD 102 or by the analytics system 108. For example, the data indictive of performance may be indicative of operation of the device or of software executing on a processor of the device.

At 1012, the data indicative of the performance of the device is sent. The data may be sent to a data store. Alternatively or in addition, the data may be sent to a computing device via a wired or wireless communication link. In one example, the data may be sent to the computing device through a network 312.

Figure 11:
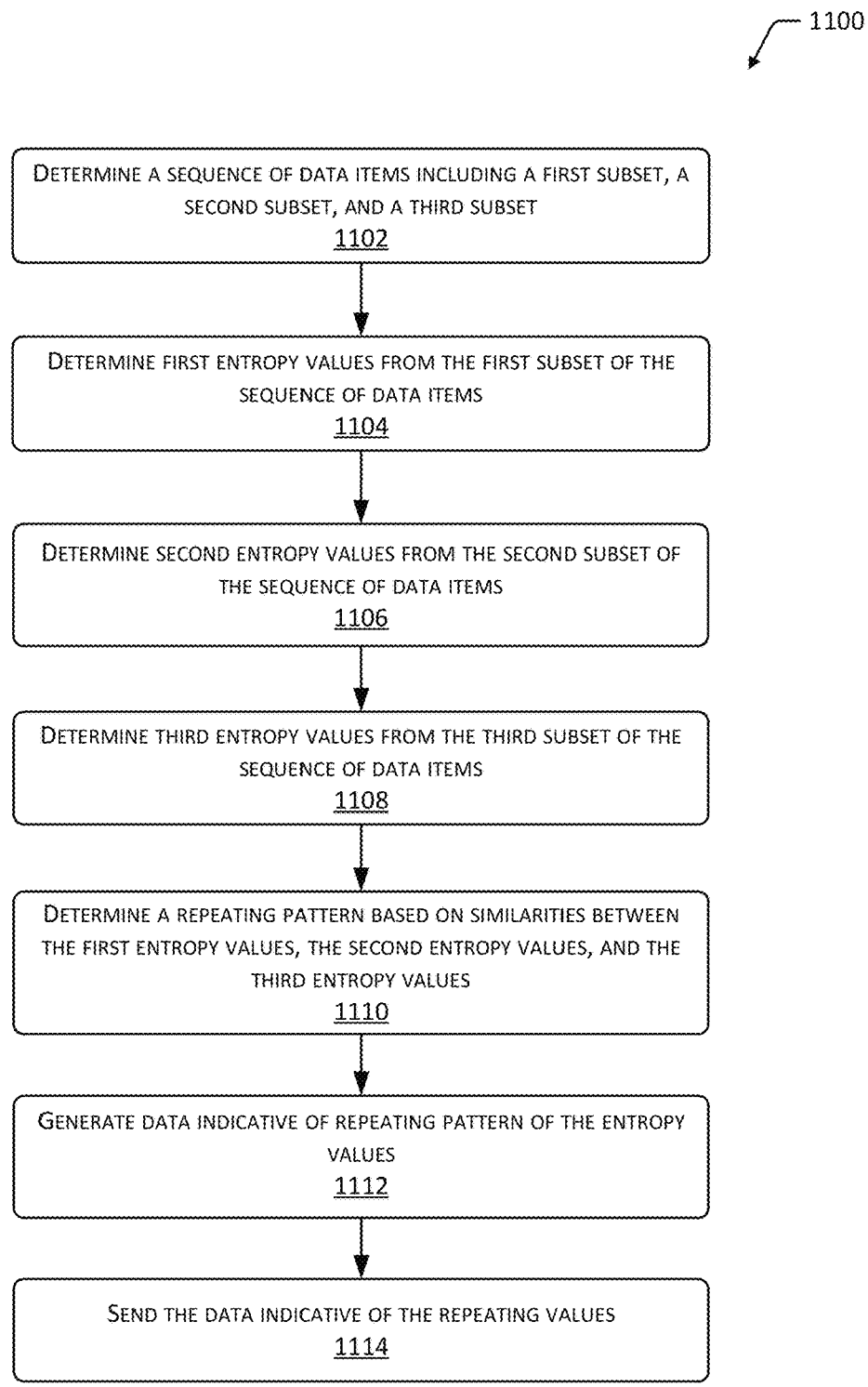
FIG. 11 depicts a flow diagram of a method of determining data indicative of a repeating pattern of entropy values within the scope of the present disclosure, according to one implementation.

FIG. 11 depicts a flow diagram 1100 of a method of determining data indicative of a repeating pattern of entropy values 138 within the scope of the present disclosure, according to one implementation. In some implementations, the method may be performed by the analytics system 108 or by the management server 318. In other implementations the performance module 114 of the TD 102 may determine repeating patterns by processing the entropy data 120 in the background during idle periods.

At 1102, a sequence of data items is determined including a first subset, a second subset, and a third subset. For example, a plurality of images stored for presentation on a display 104 device may be retrieved from a display buffer. The data items may be images, matrices of numeric values (1s and 0s, grayscale values between 0 and 255, or other ranges of values), other types of data, or any combination thereof. For example, each data value of a greyscale image may represent a brightness of a particular pixel within the image, the data value may be within a range of 0 to 255. Other data value ranges are also possible. Further, the subsets may include data items that share similarities in their entropy values 138 or in changes between entropy values 138 within the subsets. For example, a particular sequence of changes in entropy values 138, such as a sequence defining a linearly decreasing slope followed by a rapid increase (such as an impulse or steep slope representing a rapid change in entropy values 138), may represent a pattern that may repeat. The initial entropy value 138 before the decreasing slope may vary across the time-series. Additionally, the slope of the decreasing entropy values 138 may also vary. However, the characteristic decreasing slope followed by the rapid increase may occur at various times.

At 1104, first entropy values 138 are determined from the first subset of the sequence of data items. The first entropy values 138 may represent distributions of data values comprising the data items within the first subset. For example, a first plurality of entropy values 138 may be determined for at least a portion of the plurality of images. The portion may be a subset of the plurality of images.

At 1106, second entropy values 138 are determined from the second subset of the sequence of data items. For example, the second entropy values 138 may be determined in the same manner as the first entropy values 138.

At 1108, third entropy values 138 are determined from the third subset of the sequence of data items. The third entropy values 138 may be determined in the same manner as the first and second entropy values 138. The first, second, and third entropy values 138 may be determined by the TD 102, by the analytics system 108, or by the management server 318, depending on the implementation.

At 1110, a repeating pattern is determined based on similarities between the first entropy values 138, the second entropy values 138, and the third entropy values 138. For example, the repeating pattern may be determined from a first plurality of entropy values 138. The pattern may represent operation of the application in response to input data, in response to execution of particular functions, and so on. In some embodiments, the repeating pattern may correspond to a loading indicator 106.

At 1112, data indicative of performance of the computing device is generated based at least in part on the repeating pattern of the entropy values 138. For example, the performance of the computing device may be based on the performance of some other system, such as a network throughput delay, a delay in a webserver responding, or delay caused by another system. In another example, the performance of the computing device may be based on the application code executing on the computing device. Other examples are also possible.

In one implementation, the data indicative of the performance may include identification of the cause of the performance of the computing device, such as network throughput issues, user inputs, application function calls, and so on.

At 1114, the data indicative of the performance indicated by the repeating values may be sent. The data may be sent to a data store. Alternatively or in addition, the data may be sent to a computing device via a wired or wireless communication link. In one example, the data may be sent to the computing device through a network 312.

While the techniques above describe the use of video or other image-based data that is associated with presentation by the device, other types of data may be similarly assessed. For example, the entropy of audio data or haptic data may be assessed.

In conjunction with the devices, systems, and methods described above with respect to FIGS. 1-11, entropy in the distribution of data values within a sequence of data items (such as images) may be evaluated in a time-series to detect latency intervals 144 that may correspond to periods of static information or low information being presented to a display 104 of the device. An entropy value 138 representing a sum of a distribution of probabilities of data values may be determined for each data item.

In some implementations, the entropy values 138 from one or more devices may be provided to a machine learning (ML) system or to a neural network (NN) system to analyze the data. The ML system, the NN system, or both may process the entropy values 138 together with network throughput values and other data. Over time, the ML system, the NN system, or both may identify patterns in the data and may classify at least some of the patterns. In some implementations, the ML system, the NN system, or both may determine the cause of particular latency issues and may selectively notify the developer 302 to correct coding issues and optionally to improve the overall performance of the application.

In some implementations, a method implemented on a computing device may include determining, from a sequence of images including a first image and a second image stored for presentation on a display 104 device, a first entropy value 138 indicative of a distribution of data values within the first image. The method may further include determining, from the sequence of images, a second entropy value 138 indicative of a distribution of data values within the second image. Additionally, the method may include generating data indicative of performance of the computing device based on the first entropy value 138 and the second entropy value 138 and providing the data indicative of the operation of the computing device to a computing device through a communications network 312.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method implemented on a first computing device, the method comprising:
   determining a first image and a second image, wherein the first image and the second image are stored for presentation on a display device, and wherein the first image and the second image are associated with an application;
   determining a first entropy value indicative of a distribution of data values associated with the first image at a first time;
   determining a second entropy value indicative of a distribution of data values associated with the second image at a second time;
   determining low information content based on a comparison of a first threshold value to entropy values of a sequence of images that includes the first image and the second image;
   determining a first network throughput value during a first period of time, wherein the first period of time includes at least the first time;
   determining a second network throughput value during a second period of time, wherein the second period of time includes at least the second time;
   determining a portion of the application associated with the first image and the second image;
   generating report data indicative of the portion of the application, wherein the report data is indicative of performance of the application and is based on the first entropy value, the second entropy value, the first network throughput value, and the second network throughput value; and
   providing the report data to a second computing device using a communications network.

2. The method of claim 1, wherein the report data is indicative of:
   the first entropy value being less than the first threshold value; and
   the second entropy value being less than the first threshold value.

3. The method of claim 1, further comprising:
   determining a difference between the first entropy value and the second entropy value; and
   determining the difference is less than a second threshold value, wherein the report data is further indicative of the difference.

4. The method of claim 1, further comprising:
   determining a plurality of images stored for presentation on the display device, wherein the plurality of images comprises the first image and the second image;
   determining a first plurality of entropy values for at least a portion of the plurality of images;
   determining a repeating pattern in the first plurality of entropy values; and
   determining an operation of the application associated with the repeating pattern;
   wherein the reporting data is further indicative of the operation of the application.

5. The method of claim 1, further comprising:
   determining a first input at the first time; and
   determining a pattern associated with the first input.

6. A computing device comprising:
   a display device;
   a memory storing computer-executable instructions; and
   a processor to execute the computer-executable instructions to:
      determine a plurality of images stored for presentation on the display device, wherein the plurality of images are associated with an application;
      determine a first set of entropy values for a first set of the plurality of images for a first period of time, wherein each entropy value of the first set of entropy values is representative of a distribution of data values of an image of the plurality of images;

determine a repeating pattern of entropy values in the first set of entropy values;

determine a first network throughput value during a second period of time, wherein the second period of time includes at least a first portion of the first period of time;

determine a second network throughput value at a third period of time, wherein the third period of time includes at least a second portion of the first period of time;

determine a portion of the application associated with the repeating pattern of entropy values; and generate report data indicative of the portion of the application, wherein the report data is indicative of performance of the computing device and is based on the repeating pattern of entropy values, the first network throughput value, and the second network throughout value.

7. The computing device of claim 6, further comprising computer-executable instructions that cause the processor to:

select a first data value from a first image of the plurality of images;

determine a first probability value for the first data value, wherein the first probability value is indicative of a likelihood that the first data value has a first value;

select a second data value from the first image;

determine a second probability value for the second data value, wherein the second probability value is indicative of a likelihood that the second data value has a second value; and sum the first probability value and the second probability value to determine a first entropy value for the first image, the first set of entropy values including the first entropy value.

8. The computing device of claim 6, further comprising computer-executable instructions that cause the processor to:

determine that at least a portion of the first set of entropy values are less than a threshold value; and determine that the at least a portion corresponds to a fourth period of time that is greater than a time threshold;

wherein the report data is indicative of one or more of an optimization or a modification associated with the portion of the application and based on the fourth period of time.

9. The computing device of claim 6, further comprising computer-executable instructions that cause the processor to:

determine a subset of data values of a first image of the at least portion of the plurality of images; and determine a first entropy value for the first image based on the subset of data values.

10. The computing device of claim 6, further comprising computer-executable instructions that cause the processor to:

determine a second set of entropy values associated with a second set of the plurality of images; and determine a second repeating pattern within the second set of entropy values, wherein the second repeating pattern corresponds to historical data.

11. The computing device of claim 6, further comprising computer-executable instructions that cause the processor to:

determine a second set of entropy values associated with a second set of the plurality of images;

determine a third set of entropy values associated with a third set of the plurality of images; and determine a second repeating pattern in at least one of the second set of entropy values and the third set of entropy values.

12. The computing device of claim 6, further comprising computer-executable instructions that cause the processor to:

determine a first input at a first time; and determine a second pattern associated with the first input.

13. The computing device of claim 6, further comprising computer-executable instructions that cause the processor to:

determine a first entropy value of a first image of the plurality of images;

determine a second entropy value of a second image of the plurality of images;

determine a difference between the first entropy value and the second entropy value; and determine that the difference is less than a threshold value.

14. A device comprising:

a processor to:

determine a sequence of data items for presentation via an output device, the sequence of data items including a first data item and a second data item, wherein the data items of the sequence of data items are associated with an application;

determine, for the first data item, a first entropy value representative of a distribution of data values within the first data item;

determine, for the second data item, a second entropy value representative of a distribution of data values within the second data item;

determine a repeating pattern based on the first entropy value and the second entropy value;

determine a first network throughput value at a first time;

determine a second network throughput value at a second time;

determine a portion of the application associated with the first data item and the second data item; and generate report data indicative of performance of one or more of the application or a computing device executing the application, wherein the report data is based on the first entropy value, the second entropy value, the first network throughput value, and the second network throughput value.

15. The device of claim 14, wherein the processor is further configured to:

determine, for a first data value of the first data item, a first probability value indicative of a likelihood that the first data value has a first value; and determine, for a second data value of the first data item, a second probability value indicative of a likelihood that the second data value has a second value;

wherein the first entropy value comprises a sum of the first probability value and the second probability value.

16. The device of claim 14, wherein the processor is further configured to:

determine a subset of the sequence of data items having entropy values below a threshold value; and determine the subset corresponds to a period of time greater than a time threshold.

17. The device of claim 14, wherein the processor is further configured to:

determine a second entropy value for a portion of the sequence of data items;

determine a pattern of entropy values over time; and generate data based on the pattern of entropy values.

18. The device of claim 14, wherein the processor is further configured to:
- determine the first entropy value of the first data item of a plurality of data items;
- determine the second entropy value of the second data item of the plurality of data items;
- determine a difference between the first entropy value and the second entropy value; and
- determine the difference is less than a threshold value.

19. The device of claim 14, wherein the device further comprises a communications interface to receive input data, and wherein the processor is further configured to:
- associate the input data with one or more entropy values of a subset of data items of the sequence of data items; and
- determine that a pattern corresponds to the input data.

20. The device of claim 14, wherein the processor is further configured to:
- determine a subset of data values of the first data item; and
- determine the first entropy value for the first data item based on the subset of data values.

\* \* \* \* \*

UNITED STATES PATENT AND TRADEMARK OFFICE
CERTIFICATE OF CORRECTION

| | | |
|---|---|---|
| PATENT NO. | : 11,366,738 B2 | Page 1 of 1 |
| APPLICATION NO. | : 16/297380 | |
| DATED | : June 21, 2022 | |
| INVENTOR(S) | : Brian Perea et al. | |

It is certified that error appears in the above-identified patent and that said Letters Patent is hereby corrected as shown below:

On the Title Page

(57) Abstract:

5th sentence currently reads: In another example, particular patterns of entry values over time may be indicative of presentation of wait indicators or other user interface elements.

When it should read: --In another example, particular patterns of entropy values over time may be indicative of presentation of wait indicators or other user interface elements.--

Signed and Sealed this
Second Day of August, 2022

Katherine Kelly Vidal
*Director of the United States Patent and Trademark Office*